United States Patent
Thota et al.

(10) Patent No.: US 11,109,422 B2
(45) Date of Patent: Aug. 31, 2021

(54) RANDOM ACCESS ENHANCEMENTS FOR URLLC OVER 5G WIRELESS NETWORKS

(71) Applicant: Kabushiki Kaisha Toshiba, Minato-ku (JP)

(72) Inventors: Jayashree Thota, Bristol (GB); Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 153 days.

(21) Appl. No.: 16/441,538

(22) Filed: Jun. 14, 2019

(65) Prior Publication Data

US 2020/0396774 A1    Dec. 17, 2020

(51) Int. Cl.
| | |
|---|---|
| H04W 74/08 | (2009.01) |
| H04J 13/00 | (2011.01) |
| H04L 27/26 | (2006.01) |
| H04W 76/15 | (2018.01) |
| H04B 17/318 | (2015.01) |
| H04L 5/00 | (2006.01) |

(52) U.S. Cl.
CPC ...... H04W 74/0841 (2013.01); H04B 17/318 (2015.01); H04J 13/0062 (2013.01); H04L 27/2607 (2013.01); H04W 76/15 (2018.02); *H04L 5/001* (2013.01)

(58) Field of Classification Search
CPC .............. H04W 74/0841; H04W 76/15; H04J 13/0062; H04L 27/2607; H04L 5/001; H04B 17/318
See application file for complete search history.

(56) References Cited

U.S. PATENT DOCUMENTS

| | | | |
|---|---|---|---|
| 2014/0010214 A1* | 1/2014 | Hooli | H04W 72/0446 370/336 |
| 2014/0016573 A1 | 1/2014 | Nuggehalli et al. | |
| 2016/0262109 A1* | 9/2016 | Chen | H04W 52/146 |
| 2018/0042050 A1* | 2/2018 | Kim | H04W 74/0825 |
| 2018/0220452 A1 | 8/2018 | Sivanesan et al. | |
| 2020/0022038 A1* | 1/2020 | Han | H04W 74/006 |
| 2020/0137805 A1* | 4/2020 | Tu | H04L 5/0053 |
| 2021/0014099 A1* | 1/2021 | Lin | H04L 5/0094 |

* cited by examiner

*Primary Examiner* — Walli Z Butt
(74) *Attorney, Agent, or Firm* — Oblon, McClelland, Maier & Neustadt, L.L.P.

(57) ABSTRACT

A method of randomly accessing wireless communication resources in a LTE uplink comprising transmitting, by a user device, a plurality of random access requests wherein each request is transmitted on a different communication channel from a plurality of communication channels and each request comprises a preamble generated using a different root sequence. The method further comprises receiving, at the user device, at least one random access response via the plurality of communication channels; and completing a random access procedure on the communication channel which conveyed the random access response.

16 Claims, 14 Drawing Sheets

RANDOM ACCESS ENHANCEMENTS FOR URLLC OVER 5G WIRELESS NETWORKS

FIELD

Embodiments described herein relate generally to a method and device for randomly accessing communication resources and more specifically towards enhancements to a random access procedure which uses a preamble.

BACKGROUND

Industry 4.0 refers to a new phase in the Industrial Revolution that focuses heavily on interconnectivity, automation, machine learning, and real-time data. Factories-of-the-future (FoF) embody Industry 4.0 and include large-scale Machine-to-Machine (M2M) and Internet of Things (IoT) deployments which help manufacturers increase levels of automation, improve monitoring, enable self-diagnosis and facilitate new levels of analysis.

Devices which operate in the Factories-of-the-future can be broadly classified into two categories, namely: ultra-reliable low-latency communication (uRLLC) and Massive-machine-type communication (mMTC).

Ultra-reliable low-latency communication (uRLLC) applications are generally associated with time-critical process optimizations which can be used to support zero defect manufacturing. These applications typically require a very low latency (e.g. as low as 1 millisecond) and a very highly reliability (e.g. a packet delivery rate of 99.999%).

In contrast massive-machine-type communication (mMTC) applications typically generate small data transmissions which are not time-critical. However, these applications generally comprise a large number of connected devices (e.g. up to 100 nodes per square metre).

In the past industrial control systems have often used wired networks to exchange data between a control system and a network node. This approach typically involves considerable installation costs along with on-going maintenance costs. This level of expense can often prohibit a manufacturer from improving their factory and achieving all the benefits associated with industry 4.0.

Wireless communication technologies have been suggested as a means of connecting nodes in a sensor network. Unlike wired communication networks, wireless networks typically provide flexibility in where the nodes are deployed. Furthermore wireless communication networks are generally more reliable as they do not suffer from wear-and-tear to the same extent and typically have lower installation and maintenance costs.

Cellular wireless technologies such as 4G LTE are seen as a possible wireless communication protocol for use in the Factories-of-the-future, in part due to its success in the mobile communications sector. However, at present the existing LTE standard is unable to support ultra-low-latency communications due to the significant delay associated with link establishment. For this reason a new approach to link establishment is required.

Arrangements of the present invention will be understood and appreciated more fully from the following detailed description, made by way of example only and taken in conjunction with drawings in which.

DETAILED DESCRIPTION

Figure 1:
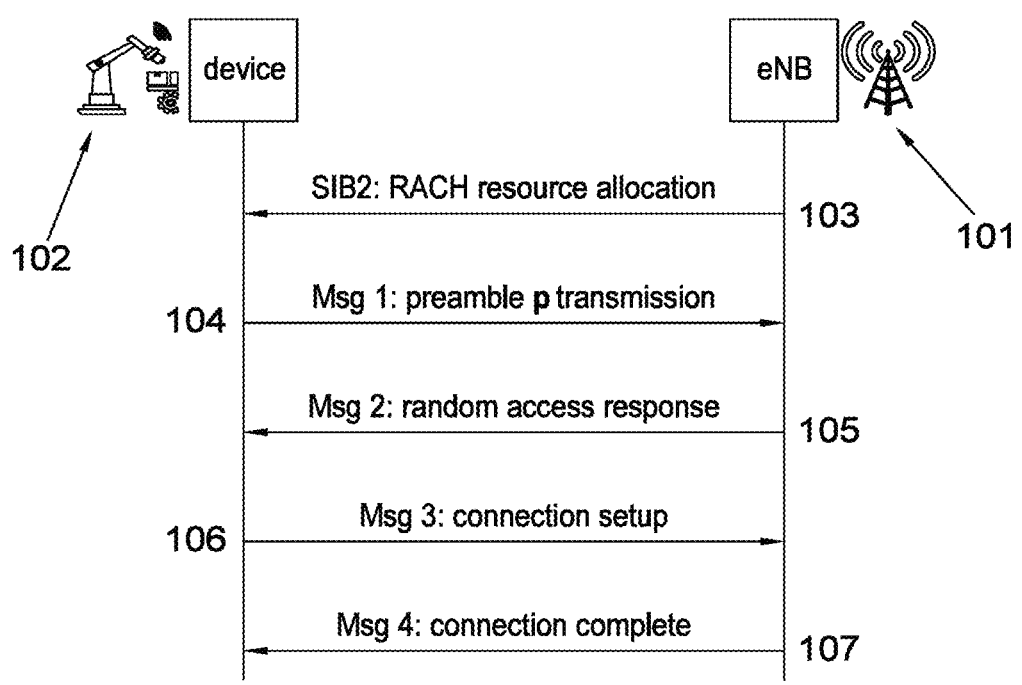
FIG. 1 shows a known contention based LTE Random Access channel (RACH) procedure.

According to a first embodiment there is provided a method of randomly accessing wireless communication resources in a LTE uplink. The method comprising transmitting, by a user device, a plurality of random access requests wherein each request is transmitted on a different communication channel from a plurality of communication channels and each request comprises a preamble generated using a different root sequence. The method further comprises receiving, at the user device, at least one random access response via the plurality of communication channels and completing a random access procedure on the communication channel which conveyed the random access response.

In an embodiment each communication channel in the plurality of communication channels operates at a different frequency.

In a further embodiment transmitting a plurality of random access requests comprises transmitting a first random access request with a first preamble on a first communication channel and transmitting a second random access request with a second preamble on a second communication channel.

In an embodiment the root sequence is generated based on a root sequence index periodically transmitted by a base station in a system information block. Optionally, the root sequence is a Zadoff-Chu sequence.

In an embodiment the method further comprises receiving two or more random access responses and completing the random access procedure on the communication channel which first conveyed the random access response.

In an embodiment a base station uses a plurality of component carriers and each communication channel uses a different component carrier from the plurality of component carriers.

In an embodiment the first communication channel comprises a first component carrier of the base station and the second communication channel comprises a second component carrier of the base station.

In a different embodiment each communication channel is established with a different base station from a plurality of base stations. Optionally a first communication channel is established with a first base station and a second communication link is established with a second base station.

In an embodiment the plurality of base stations comprises a plurality of slave base stations communicatively connected to a master base station. Optionally, the plurality of slave base stations and the master base station are connected by an X2 interface.

In an embodiment the method further comprises communicating random access requests received by the plurality of slave base stations to the master base station, determining, at the master base station, the plurality of base stations which received a random access request from a user device, and transmitting a random access response to the user device by a base station from the plurality of base stations which received a random access request.

In an embodiment the random access request further comprises an indication of the signal strength and the method further comprises selecting which base station transmits a random access response based on the indication of signal strength in the plurality of random access requests.

In a further embodiment the preamble is generated by multiplying a first preamble by a conjugate of a second preamble.

In an embodiment the first preamble is based on a first root sequence and the second preamble is based on a cyclic shifted version of the first root sequence. Optionally, the first and the second preambles are Zadoff-Chu sequences.

In an embodiment the method further comprises decoding the preamble using an augmented table comprising a plurality of root sequences and each possible combination of the plurality of root sequences.

According to a further embodiment there is provided a method of operating a user device in an LTE network. The method comprising transmitting a plurality of random access requests wherein each request is transmitted on a different communication channel from a plurality of communication channels and each random access request comprises a preamble generated using a different root sequence. The method further comprises receiving at least one random access response via the plurality of communication channels; and completing a random access procedure on the communication channel which conveyed the random access response.

In an embodiment the method further comprises receiving two or more random access responses and completing the random access procedure on the communication channel which first conveyed the random access response.

In an embodiment each communication channel uses a different component carrier of a base station.

In an embodiment each communication channel is established with a different base station from a plurality of base stations In an embodiment the random access request further comprises an indication of the base stations signal strength In an embodiment the preamble is generated by multiplying a first preamble based on a first root sequence by a conjugate of a second preamble based on a cyclic shifted version of the first root sequence.

According to a further embodiment there is provided a method of operating a base station in a LTE network comprising a plurality of base stations wherein the base station is operable in a master configuration and a slave configuration. The method comprises receiving a random access request from a user device; and in the slave configuration; communicating the random access request and an identifier associated with the user device to a master base station and transmitting a random access response to the user device when instructed by the master base station. When the base station is in the master configuration the method comprises determining a number of base stations which received a random access request from the user device, determining, a base station from the number of base stations to transmit a random access response and instructing a base station from the number of base to transmit a random access response to the user device.

In an embodiment the random access request comprises an indication of signal strength and determining a base station from the number of base stations is based on the indication of signal strength in the random access requests. Optionally, the plurality of base stations are communicatively connected to each other by an X2 interface.

In an embodiment the random access request comprises a preamble and the method further comprises decoding a preamble using an augmented table comprising a plurality of root sequences and each possible combination of the plurality of root sequences.

Devices for use with the above described methods are also disclosed herein.

According to a further embodiment there is provided an LTE network comprising a base station and a user device wherein the user device is configured to transmit a plurality of random access requests wherein each request is transmitted on a different communication channel from a plurality of communication channels and each request comprises a preamble generated using a different root sequence. The user device is further configured to receive at least one random access response via the plurality of communication channels and complete a random access procedure on the communication channel which conveyed the random access response.

In an embodiment the user device is further configured to receive two or more random access responses and complete the random access procedure on the communication channel which first conveyed the random access response.

In an embodiment the base station uses a plurality of component carriers and each communication channel uses a different component carrier from the plurality of component carriers.

In a different embodiment each communication channel is established with a different base station from a plurality of base stations.

In an embodiment the plurality of base stations comprises a plurality of slave base stations communicatively connected to a master base station.

In a further embodiment a slave base station is configured to communicate random access requests received by the slave base station to a master base station. The master base station being configured to determine a number of base stations which received a random access request from a user device and instruct a base station from the number of base stations which received the random access request to transmit a random access response to the user device.

In an embodiment the random access request further comprises an indication of the signal strength and the master base station is further configured to select which base station transmits a random access response based on the indication of signal strength in the plurality of random access requests.

In an embodiment the preamble is generated by multiplying a first preamble based on a first root sequence by a conjugate of a second preamble based on a cyclic shifted version of the first root sequence.

According to a further embodiment there is provided a base station for use in an LTE network. The base station comprising a processor and having a master configuration and a slave configuration. The processor being configured to receive a random access request from a user device, and in the slave configuration; communicate the random access request and an identifier associated with the user device to a master base station and transmit a random access response to the user device when instructed by the master base station. In the master configuration the base station is configured to; determine a number of base stations which received a random access request from the user device, determine, a base station from the number of base stations to transmit a random access response and instruct a base station from the number of base stations which received the random access request to transmit a random access response to the user device.

In an embodiment the random access request comprises an indication of signal strength and the processor is further configured to determine a base station from the number of base stations based on the indication of signal strength in the random access requests. Optionally, the processor is configured to communicate the random access request via a X2 interface.

According to a further embodiment there is provided a device for use in an LTE network. The device comprises a processor which is configured to transmit a plurality of random access requests wherein each request is transmitted on a different communication channel from a plurality of communication channels and each random access request comprises a preamble generated using a different root sequence. The processor further being configured to receive at least one random access response via the plurality of communication channels and complete a random access procedure on the communication channel which conveyed the random access response.

In an embodiment the processor is further configured to: receive two or more random access responses and complete the random access procedure on the communication channel which first conveyed the random access response.

In an embodiment each communication channel uses a different component carrier of a base station.

In an embodiment the processor is configured to measure a signal strength of a base station and transmit a random access request comprising an indication of the base station's signal strength.

In an embodiment the processor is configured to generate the preamble by multiplying a first preamble based on a first root sequence by a conjugate of a second preamble based on a cyclic shifted version of the first root sequence.

Also disclosed are methods and devices for the generation of combined preamble code words.

According to a further embodiment there is provided a method of randomly accessing wireless communication resources in a LTE uplink. The method comprises transmitting a random access request comprising a preamble code word wherein the preamble code word is generated by combining a plurality of preambles.

In an embodiment combining a plurality of preambles comprises multiplying a first preamble by a conjugate of a second preamble.

In an embodiment the first preamble is based on a first root sequence and the second preamble is based on a cyclic shifted version of the first root sequence. In a further embodiment the first root sequence and the second root sequence are generated based on a random access channel root sequence index periodically transmitted by a base station in a system information block.

In an embodiment the first root sequence and the second root sequence are Zadoff-Chu sequences. Optionally, the root index of the preamble code word is the sum of a root index of the first root sequence and a root index of the second root sequence.

According to further embodiment there is provided a method of operating an LTE base station. The method comprising: receiving a random access request comprising a preamble, and identifying the preamble from an enhanced set of preambles. The enhanced set of preambles comprising: a plurality of preambles generated from a plurality of root sequences, and a plurality of combined preambles generated by combining two preambles from the plurality of preambles.

In an embodiment combining a plurality of preambles comprises multiplying a first preamble by a conjugate of a second preamble.

In a further embodiment the first preamble is based on a first root sequence and the second preamble is based on a cyclic shifted version of the first root sequence. Optionally the first root sequence and the second root sequence are Zadoff-Chu sequences.

Devices for use with such methods are also disclosed herein.

According to a further embodiment there is provided a LTE network wherein a user device is configured to transmit a random access request comprising a preamble code word wherein the preamble code word is generated by combining a plurality of preambles.

In an embodiment combining a plurality of preambles comprises multiplying a first preamble by a conjugate of a second preamble.

In a further embodiment the first preamble is based on a first root sequence and the second preamble is based on a cyclic shifted version of the first root sequence. Optionally, the first root sequence and the second root sequence are Zadoff-Chu sequences.

According to a further embodiment there is provided a base station for use in an LTE network. The base station comprising a processor which is configured to receive a random access request comprising a preamble and identify the preamble from an enhanced set of preambles, wherein the enhanced set of preambles comprises: a plurality of preambles generated from a plurality of root sequences, and a plurality of combined preambles generated by combining two preambles from the plurality of preambles.

In an embodiment combining a plurality of preambles comprises multiplying a first preamble by a conjugate of a second preamble.

In an embodiment the first preamble is based on a first root sequence and the second preamble is based on a cyclic shifted version of the first root sequence. Optionally, the first root sequence and the second root sequence are Zadoff-Chu sequences.

According to a further embodiment there is provided a device for use in an LTE network. The device comprising a processor which is configured to transmit a random access request comprising a preamble code word wherein the preamble code word is generated by combining a plurality of preambles.

In an embodiment combining a plurality of preambles comprises multiplying a first preamble by a conjugate of a second preamble.

In an embodiment the first preamble is based on a first root sequence and the second preamble is based on a cyclic shifted version of the first root sequence. Optionally, the first root sequence and the second root sequence are Zadoff-Chu sequences.

In general, when a User Equipment (UE) device want to send data in the LTE uplink (i.e. to the base station, or eNodeB (eNB)) the initial connection is established using a procedure known as Random Access (RA).

As part of the Random Access (RA) procedure the device requests radio resources from the eNodeB (eNB) by randomly selecting a preamble from a set of possible preambles. When the network contains multiple devices it is possible that two devices could randomly select the same preamble from the fixed set of preambles. If two devices attempt the Random Access (RA) procedure at the same time, using the same preamble, a collision will occur.

After a collision has occurred, each device backs-off for a time before reattempting the Random Access (RA) procedure. Backing off in this way adds an additional delay to the time required to setup a data connection with the eNodeB. Collisions can be particularly prevalent in networks comprising high traffic loads and large numbers of simultaneous access requests.

For example, in Factories-of-the-future the cells are densely populated with nodes that sporadically transmit data. In these circumstanced the Random Access (RA) procedure can take up to 150 milliseconds. This amount of delay, introduced mainly by backing off after a collision, makes the current LTE standard unsuitable for ultra-reliable low-latency communications (uRLLC) applications where the latency requirements can be as low as 1 millisecond.

In order to reduce the latency associated with the Random Access (RA) procedure, methods and devices disclosed herein prevent collisions, and therefore remove the latency associated with backing-off from the Random Access (RA) procedure.

FIG. 1 shows a known contention based LTE Random Access channel (RACH) procedure. FIG. 1 shows a message exchange between an eNodeB (eNB) 101 and a User Equipment (UE) device 102.

The message exchange begins in step 103 by the eNodeB 101 broadcasting Random Access channel (RACH) resource allocation parameters as part of a system-information-block type 2 (SIB2) message.

A Random Access slot is a periodic time-frequency resource in which the Random Access channel is divided. Each Random Access slot requires 1.08 MHz of bandwidth in the uplink channel and is divided into 6 Resource Blocks. The number of Random Access slots per frame is detailed by the Physical Random Access Channel (PRACH) Configuration Index contained within the SIB2 message which is periodically broadcast by the eNodeB 101.

Accordingly, after receipt of the SIB2 message the User Equipment (UE) device 102 can determine the Random Access subframes (i.e. where in the time domain) and the resource blocks (i.e. where in the frequency domain) which could be used to initiate the random access procedure.

When a User Equipment (UE) device 102 wants to connect to the LTE network, a four-message exchange is initiated, as shown in FIG. 1. The random access attempt is considered a success when a User Equipment (UE) device 102 has completed the fourth-step of the procedure (i.e. received 'Msg 4').

After receiving the SIB2 message, the User Equipment 102 generates 64 orthogonal Zadoff-Chu sequences using the root sequence index and the configuration index from the SIB2 message. The User Equipment (UE) device then randomly selects one of these sequences, also known as the preamble, for use as part of a connection request with the eNodeB (eNB).

In step 104 the User Equipment transmits the selected preamble in Message 1 ('Msg 1').

The preamble contained within Message 1 ('Msg 1') is detected at the eNodeB 101 by performing a cross correlation with the root sequence index broadcast in the SIB2 message (step 103). After decoding the preamble the eNodeB computes the associated Random Access Radio Network Temporary Identifier (RA-RNTI) based on the physical resource where the preamble was sent.

If the eNodeB detects a preamble, it replies by sending a Message 2 ('Msg 2'), also known as a Random Access Response (RAR), over the Physical Downlink Shared CHannel (PDSCH). The Random Access Response (RAR) contains, amongst other things; the identity of the detected preamble, an initial uplink resource grant (to be used in 'Msg3') and an assigned Temporary Cell Radio Network Temporary Identifier (C-RNTI).

In step 106 the User Equipment (UE) transmits Message 3 ('Msg 3') which is the radio resource control (RRC) connection request using the resource allocation information contained within 'Msg 2'. This message also contains, amongst other things, a serving temporary mobile serving identity, (S-TMSI), which uniquely identifies the User Equipment (UE). The UE uses a stored value for this parameter if it was previously connected to the network, or uses a random number generated by the User Equipment if it was not previously connected to the network.

If the eNodeB 101 is able to detect the RRC connection request ('Msg 3') sent by the User equipment in step 106, the eNodeB transmits Message 4 ('Msg 4') which is a Radio Resource Control (RRC) connection setup message. The RRC connection setup message comprises, amongst other things, configuration information for Physical Uplink Shared Channel (PUSCH), Physical Uplink Control Channel (PUCCH) and information regarding uplink power control.

The Random Access (RA) procedure discussed above is regarded as a success if the device which transmits a 'Msg 1' receives a 'Msg 4'.

There are multiple points in the Random Access (RA) procedure discussed above where a collision could be observed.

If multiple User Equipment (UE) devices transmit the same preamble (i.e. 'Msg 1') over the same resources then the eNodeB might detect the collision during 'Msg 1' based on the difference in transmission delay. If the colliding preambles are received with a high enough Signal-to-Noise Ratio (SNR) and are sufficiently spaced apart in time the eNodeB can detect the collision at 'Msg 1'. In this case it will not provide a Random Access Response message (i.e. 'Msg 2') for this preamble and as a result each User Equipment device using the preamble will back-off for a time period before reattempting the random access procedure.

However, if the devices are at the same distance from the eNodeB, the collision might be not be detected at 'Msg 1' and the same Random Access information (for use during the transmission of 'Msg 3') will be obtained by more than one device since the Random Access Request (RAR) (i.e. 'Msg 2') is addressed to the RA-RNTI which is shared by all User Equipment (UE) devices which transmit the same preamble on the same resources.

In this case each device receiving the Random Access Request (RAR) message (i.e. 'Msg 2') attempts to access the resources simultaneously (for the transmission of 'Msg 3') and therefore causes a collision.

Figure 2:
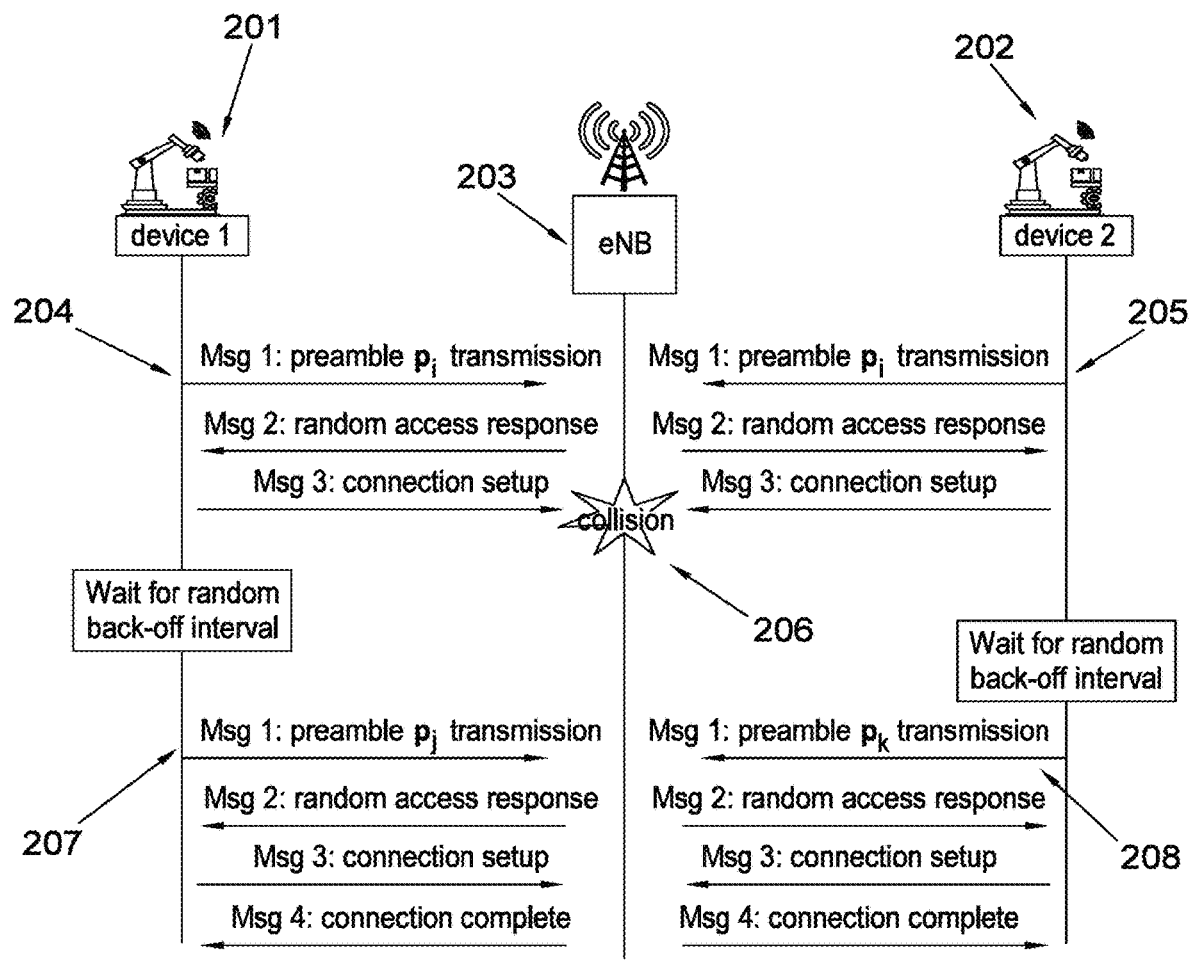
FIG. 2 shows a collision in a known contention based LTE Random Access channel (RACH) procedure.

FIG. 2 shows a collision in a known contention based LTE Random Access channel (RACH) procedure. FIG. 2 shows a timeline of message exchanges in a network comprising a first User Equipment (UE) device 201, a second User Equipment (UE) device 202 and an eNodeB 203. The first User Equipment 201 and the second User Equipment 202 use the standard Random Access (RA) procedure discussed above in relation to FIG. 1. As a result a detailed discussion of each message will be omitted.

In FIG. 2 the Random Access CHannel (RACH) procedure begins with both the first User Equipment (UE) 201 and the second User Equipment (UE) 202 transmitting a 'Msg 1' (steps 204 and 205 respectively) using the same resources (i.e. at the same time and at the same frequency).

In FIG. 2 both the first User Equipment (UE) 201 and the second User Equipment (UE) 202 randomly select the same preamble ($p_i$) from the set of preambles generated by each User Equipment (UE) (based on information contained within the SIB2 message periodically broadcast by the eNodeB 203).

If multiple devices select the same preamble and they send it over the same Random Access slot, the eNodeB could detect a collision based on a difference in transmission delays. If a collision occurs at 'Msg 1' the eNodeB will not provide a Random Access Response for the colliding preamble. As a result each device will back-off for a time period before reattempting the random access procedure.

However, in FIG. 2 a collision is not detected by the eNodeB 203 at 'Msg 1' (i.e. messages 204 and 205).

Since both User Equipment (UE) devices (201 and 202) initiate the Random Access channel (RACH) Procedure with the same preamble sequence, both User Equipment (UE) devices (201 and 202) will respond to a single 'Msg 2'. As a result both the first User Equipment (UE) 201 and the second User Equipment (UE) 202 will transmit 'Msg 3' (i.e. the RRC connection request message) on the same resources and cause a collision 206 at the eNodeB 203.

If the eNodeB 203 cannot successfully decode 'Msg 3' (i.e. a collision has occurred), it will not transmit 'Msg 4'. In the absence of a 'Msg 4' the User Equipment (UE) device will wait for an amount of time (otherwise known as backing-off) before repeating the Random Access CHannel (RACH) procedure by retransmitting a 'Msg 1' with another randomly selected preamble.

This step can be seen in FIG. 2 where it shows the first User Equipment (UE) 201 transmitting a 'Msg 1' with a second preamble ($p_j$) 207 and the second User Equipment (UE) 202 transmitting a 'Msg 1' with a third preamble ($p_k$) 208. By repeating the Random Access (RA) procedure with another randomly selected preamble the probability that the first User Experience (UE) 201 and the second User Experience (UE) 202 collide again is minimized.

Furthermore, since each User Equipment applies a random back-off the 'Msg 1' with a second preamble ($p_j$) 207 will most probably be transmitted at a different time to the 'Msg 1' with a third preamble ($p_k$) 208, further minimizing the likelihood of a second collision.

That being said, as the number of devices attempting to access the network increases so will the probability of two User Equipment (UE) devices selecting the same preamble. This problem is colloquially known as the "Massive Access problem" and is especially relevant in ultra-reliable low-latency communication (uRLLC) applications where stringent delay and reliability requirements exist.

One way to reduce the collision probability, and therefore minimize any delay associated with link establishment is to use parallel preamble transmissions.

In LTE it is possible for each device (or User Equipment (UE)) to have dual connectivity (DC) functionality. Dual connectivity allows a User Equipment (UE) to be served simultaneously by two different eNodeBs operating at different carrier frequencies. This functionality is often realized at the User Equipment (UE) by using a separate transceiver and protocol stack for communicating with each eNodeB.

Figure 3:
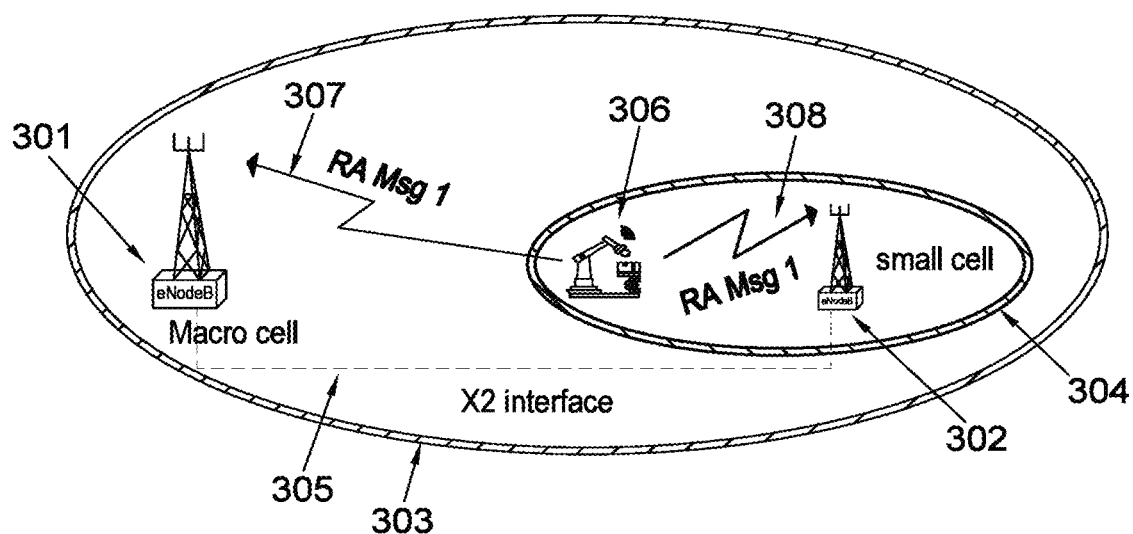
FIG. 3 shows a configuration of a first and a second eNodeB.

FIG. 3 shows a configuration of a first and a second eNodeB. FIG. 3 shows a first eNodeB 301 providing a first coverage 303 and a second eNodeB 302 with a second coverage 304. FIG. 3 also shows a User Equipment (UE) 306 which is within the first coverage area 303 and the second coverage area 304. The first and second coverage areas (303 and 304) represent an area within which a User Equipment (UE) device can form a communicative connection with the eNodeB.

In FIG. 3 the first eNodeB 301 and the second eNodeB are communicatively coupled to each other using an X2 interface 305. In FIG. 3 the first and the second eNodeB are configured in a Master-eNodeB (MeNB), Secondary-eNodeB (SeNB) relationship. Typically the Master-eNodeB (MeNB) provides a higher coverage than the secondary-eNodeB (SeNB). In FIG. 3 the Master-eNodeB is the first eNodeB 301 and the Secondary-eNodeB (SeNB) is the second eNodeB 302.

In FIG. 3 the User Equipment has dual connectivity (DC) and is configured to communicate with the first eNodeB 301 and the second eNodeB 302. Although dual connectivity (DC) is generally exploited when the User Equipment 306 is in the connected mode (i.e. when network resources are assigned to the User Equipment (UE)) this functionality could also be used in the idle mode (i.e. when the User Equipment has no network resources assigned to it).

In an embodiment the User Equipment (UE) is configured to perform the Random Access (RA) procedure on both the Master-eNodeB and the Secondary-eNodeB independently and simultaneously as represented in FIG. 3 by a first random access message 307 and a second random access message 308.

Figure 4:
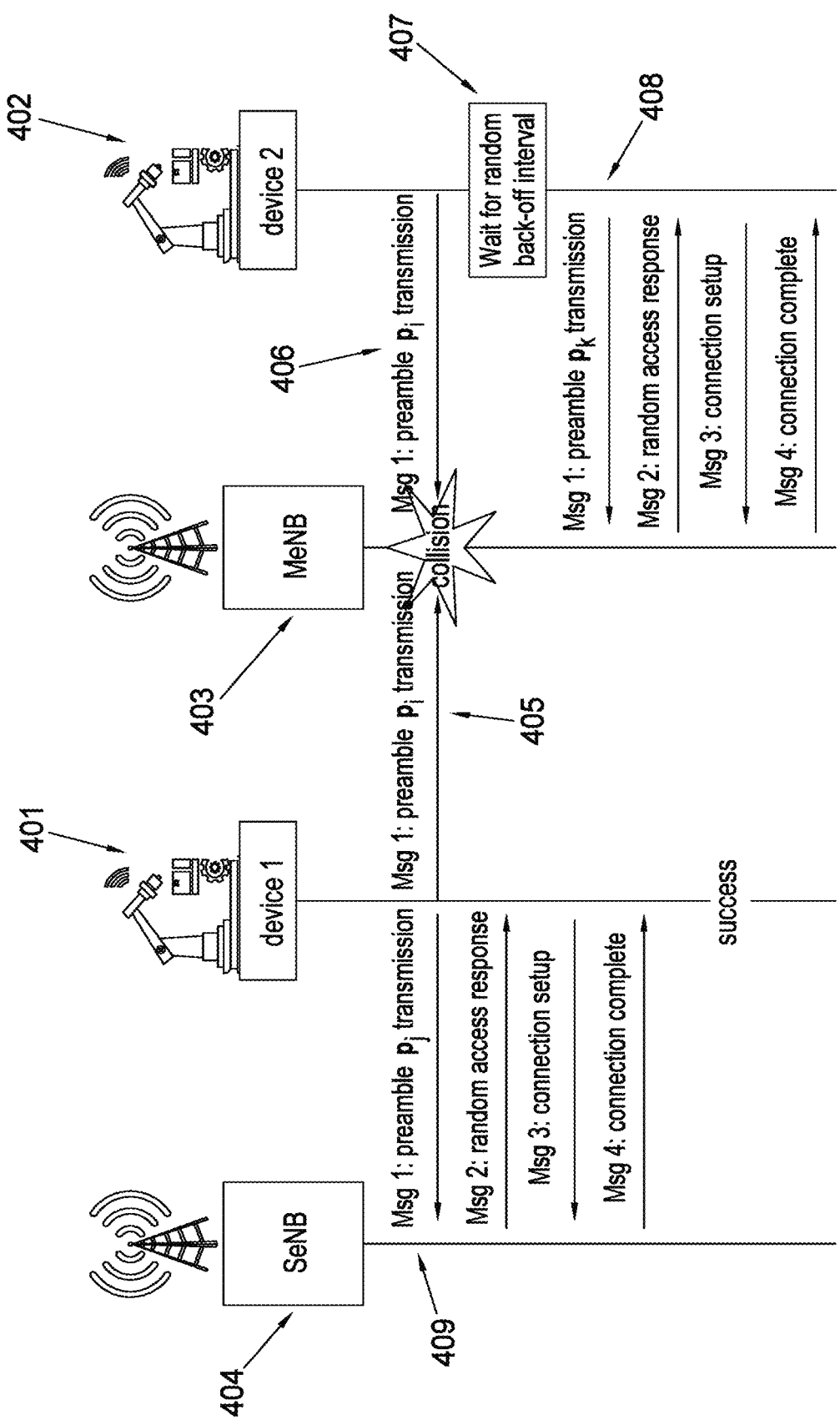
FIG. 4 shows a Random Access procedure using parallel preamble transmissions according to an embodiment.

FIG. 4 shows a Random Access (RA) procedure using parallel preamble transmissions according to an embodiment. FIG. 4 shows an exchange of messages between a Master-eNodeB 403, a Secondary-eNodeB 404 and a first User Equipment (UE) device 401 which is configured according to an embodiment. FIG. 4 also shows a message exchange between a second User Equipment (UE) device 402 and the Master-eNodeB 403.

In FIG. 4 the first User Equipment (UE) device 401 has dual connectivity (DC) and the Master-eNodeB 403 and the Secondary-eNodeB 404 do not use X2 co-ordination.

The Random Access procedure shown in FIG. 4 begins with the first User Equipment device 401 using the standard Random Access procedure in step 405, as described in FIG. 1. In FIG. 4 the first User Equipment device 401 randomly selects a first preamble ($p_i$) from the set of possible preambles (which is generated based on the contents of the SIB2 message broadcast by the Master-eNodeB 403).

At the same time, and using the same resources, another device (specifically, the second User Equipment (UE) device 402) begins the standard Random Access procedure in step 406. Both the first User Equipment (UE) device 401 and the second User Equipment (UE) device 402 randomly select the same preamble (i.e. $p_i$). As a result, the random access procedure initiated by the first User Equipment (UE) device 401 and the second User Equipment (UE) device 402 results in a collision.

In FIG. 4 the collision is shown at 'Msg 1', signifying that the Random Access procedure will ultimately result in a collision and will therefore be unsuccessful. Although FIG. 4 shows the collision at 'Msg 1' it is emphasized that the collision may be detected at the corresponding 'Msg 3' in accordance with the example of FIG. 2.

In addition to beginning the Random Access procedure on the master-eNodeB 403, the second User Equipment (UE) 401 also begins the Random Access procedure on the secondary-eNodeB 404 using the dual connectivity functionality of the device.

When the Master-eNodeB 403 and the Secondary-eNodeB 404 are not time synchronized the User Equipment (UE) 401 begins the Random Access procedure on the Secondary-eNodeB 404 at the next available random access opportunity. As discussed above, the timing of the random access opportunities is available from the SIB2 message broadcast by the eNodeB.

When the Master-eNodeB 403 and the Secondary-eNodeB 404 are time synchronized, optionally through the Xn interface, the User Equipment (UE) 401 begins the Random Access procedure for the secondary-eNodeB 404 simultaneously to, or near-simultaneously to, the Random Access procedure on the Master-eNodeB 403.

The SIB2 periodically broadcast by the secondary-eNodeB 404 will most probably comprise a different root sequence index than the SIB2 periodically broadcast by the Master-eNodeB 403. As a result the set of possible preambles from which a preamble is randomly selected will be different. This can be seen in FIG. 4 where it shows the randomly selected preamble for the secondary-eNodeB 404 is $p_J$.

Since there is no collision detected at the secondary-eNodeB 404, the random access procedure on the secondary-eNodeB 404 completes before the random access procedure on the Master-eNodeB 403. As a result the first User Experience (UE) 401 is allocated Physical Uplink Shared Channel (PUSCH) resources by the secondary-eNodeB 404 first and uses this channel to communicate data.

If the first User Equipment (UE) 401 receives a 'Msg 4' (i.e. a radio resource control (RRC) connection setup message) from both eNodeBs (i.e. the Master-eNodeB and the Secondary-eNodeB) the first User Equipment (UE) 401 will respond to the first received 'Msg4' (or PUSCH resource allocation), thereby reducing the access delay associated with the Random Access (RA) procedure.

Using parallel preambles in this way reduces the probability of a preamble collision (i.e. where multiple devices chose the same preamble sequence) and therefore increases the probability that a connection can be formed with at least one eNodeB. Furthermore, since there is also no co-ordination on the X2 backhaul, the access delay associated with forming a connection is reduced.

FIG. 4 also shows the second User Equipment (UE) 402 reattempting the Random Access procedure 408 after backing off for a time period 407. In accordance with the standard Random Access procedure discussed above, when reattempting the Random Access procedure the second user Equipment (UE) 402 randomly selects another preamble sequence, in this case $p_K$, from the set of possible preamble sequences. Since the first User Equipment 401 has already completed the Random Access procedure with the secondary-eNodeB 404, there are no further attempts at random access from the first User Equipment 401 on the Master-eNodeB 403.

As discussed above, in FIG. 4 there is no co-ordination on the X2 interface between the Master-eNodeB 403 and the secondary-eNodeB 404.

Figure 5:
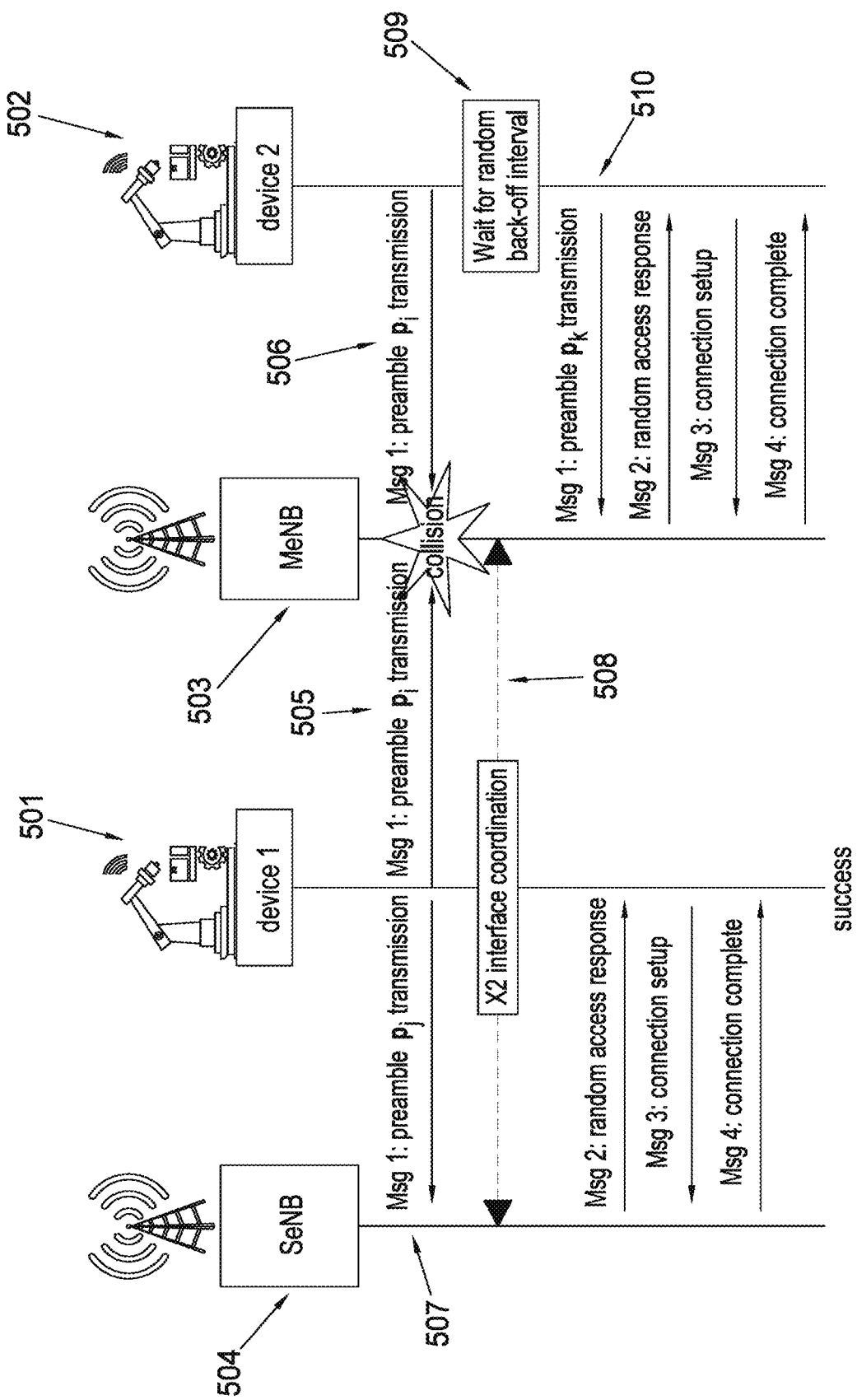
FIG. 5 shows a Random Access procedure using dual connectivity and X2 interface co-ordination according to an embodiment.

FIG. 5 shows a Random Access procedure using dual connectivity and X2 interface co-ordination according to an embodiment. FIG. 5 shows an exchange of messages during a Random Access procedure between a Master-eNodeB 503, a Secondary-eNodeB 504, a first User Equipment device 501 and a second User Equipment 502.

In FIG. 5 the Random Access requests received by the Master-eNodeB 503 and the secondary-eNodeB 504 are coordinated using an X2 interface 508. The Master-eNodeB 503 and the secondary eNodeB 504 are configured in a master-slave relationship where the master is the Master-eNodeB 503 and the slave is the Secondary-eNodeB 504. Configuring the eNodeBs in this way enables the master eNodeB to manage the network resources using the X2 interface 508.

In FIG. 5 the first User Equipment 501 measures the signal strength and quality of the signals received from an eNodeB. The signal strength, or more specifically the Reference Signal Received Power (RSRP) is measured by the User Equipment 501 for each eNodeB during cell selection. The RSRP is defined in 3GPP 36.214 as the linear average of the power contributions, in Watts, taken over the resource blocks (RBs) that carry cell-specific reference signals.

Based on the Reference Signal Received Power (RSRP), the interference and the thermal noise it is possible to determine the Received Signal Strength Indicator (RSSI). The Received Signal Strength Indicator (RSSI) is a measure of all the power present in the received radio signal, or in other words the total received wide-band power measured over all symbols. Optionally, the Received Signal Strength Indicator (RSSI) is transmitted to the eNodeB as part of 'Msg 1' i.e. the Random Access request. As previously discussed; the first User Equipment (UE) 501 is configured with dual connectivity functionality. In order to obtain uplink resources (and hence communicate data) the first User Equipment (UE) device 501 begins the standard Random Access procedure separately and simultaneously, or near-simultaneously, on each communication channel using dual connectivity.

FIG. 5 shows the first User Equipment (UE) 501 beginning the standard Random Access procedure on both the master eNodeB and the slave eNodeB (i.e. the Master-eNodeB 503 and the Secondary-eNodeB 504) at the same time.

FIG. 5 shows the first User Equipment (UE) 501 beginning the Random Access procedure with the master (i.e. Master eNodeB 503) by transmitting a first Random Access request 507 containing the preamble $p_j$. At the same time, the first User Equipment (UE) 501 begins the Random Access procedure, using the dual connectivity functionality, with the slave (i.e. Secondary-eNodeB 504) by transmitting a second Random Access request 505 containing the preamble $p_i$.

The Random Access request, along with the signal strength measurements, received at the slave (i.e. the secondary-eNodeB 504) from the first User Equipment (UE) device 501 are communicated to the master (i.e. the Master-eNodeB 503) via the X2 interface 508.

In LTE the User Equipment (UE) can be identified by each eNodeB using a Serving Temporary Mobile Identify (S-TMSI) if the User Equipment (UE) has previously been connected to the core network (via any eNodeB) before it went to sleep. This Serving Temporary Mobile Identify (S-TMSI) is sent by the User Equipment (UE) in 'Msg 1' when the User Equipment (UE) attempts to attach to an eNodeB. This enables the first Random Access request 507 and the second Random Access request 505 (made to different eNodeB's in the same core network) to be associated with the same User Equipment (UE) device thereby enabling the network to perform the network optimizations discussed below.

If, on the other hand, the User Equipment (UE) has not previously been connected to the core network (i.e. it is fresh out of the box) then the User Equipment (UE) will need to perform the full RACH procedure and successfully attach to the network. Until a Serving Temporary Mobile Identify (S-TMSI) is assigned to the User Equipment (UE) it is not possible to associate multiple random access requests (on different eNodeBs) with the same User Equipment (UE) device.

The above being said, in an embodiment a User Equipment (UE) device transmits its International Mobile Equipment Identity (IMEI) number in 'Msg 1', thereby enabling two random access requests, on different eNodeBs, to be associated with the same User Equipment (UE) device. Using this approach it is possible to perform the network optimizations discussed below, even in the absence of a Serving Temporary Mobile Identity (S-TMSI).

The X2 interface 508 control plane has a stream control transmission protocol (SCTP) transport layer protocol and can perform an uplink load management function. This facilitates the exchange of traffic load information on each eNodeB, thereby allowing the network to handle the traffic load more effectively.

In an embodiment the master eNodeB (i.e. the Master-eNodeB 503) performs network optimization based on the signal strength and quality measurements received from the first User Equipment (UE) 501 during the random access procedure.

In order to determine which eNodeB will respond to a Random Access request (by transmitting a Random Access response, or 'Msg 2') it is first necessary for the master node to determine which of the eNodeB's received the Random Access request (i.e. 'Msg 1'). Since the slave eNodeBs communicate the random access requests they receive via the X2 interface to the master eNodeB it is possible to make this determination at the master eNodeB.

Although in FIG. 5 only a single slave node (i.e. the Secondary-eNodeB 504) is connected to the master node by the X2 interface 508 it is emphasized that the random access procedure discussed herein could also be used in a network comprising a plurality of slave nodes all connected, either directly or indirectly, to the master node via an X2 interface.

If the master node (i.e. the Master-eNodeB 503) determines that a Random Access request has been received from the first User Equipment (UE) 501 on a slave eNodeB (i.e. the Secondary-eNodeB 504, in step 507) but not at the master eNodeB (i.e. the Master-eNodeB 503) then the master eNodeB will instruct the slave eNodeB (i.e. the Secondary-eNodeB 507) to transmit a Random Access response (i.e. a 'Msg 2'). Optionally, instructing the slave eNodeB to transmit a Random Access response comprises sending an acknowledgment (ACK) signal to the slave eNodeB.

If, instead of a single slave eNodeB, there are a plurality of slave nodes which each receive a Random Access request from the User Equipment (UE) device then the master eNodeB performs load-management and network optimizations using the received signal strength information. The master eNodeB subsequently instructs the relevant slave eNodeB to respond to the Random Access request, optionally using an Acknowledgment (ACK) signal.

If the master eNodeB (i.e. the Master-eNodeB 503) determines that a Random Access request has been received from the User Equipment (UE) 501 at the master eNodeB but not at any slave eNodeB's (e.g. the Secondary-eNodeB 507) then the master node will transmit a random access response.

If the master node (i.e. the Master-eNodeB 503) determines that a Random Access request has been received from the first User Equipment (UE) 501 at both the master eNodeB and a slave eNodeB (i.e. the Secondary-eNodeB 507) then the master node performs load-management and network optimizations using the received signal strength information.

If the master eNodeB selects itself to respond to the Random Access request then it will transmit a Random Access response and instruct the other slave nodes which received the Random Access request not to respond, optionally by using a negative-acknowledgment (NACK) signal. If the master eNodeB selects a slave eNodeB to respond to the Random Access request it will instruct the relevant slave eNodeB to respond to the Random Access request, optionally by using an ACK signal, and instructs the other slave eNodeB which received the Random Access request not to respond, optionally by using a negative-acknowledgment (NACK) signal.

Using X2 co-ordination between the Master-eNodeB 503 and the secondary-eNodeB 504 is advantageous as it avoids duplicating a resource allocation for the same User Equipment (UE) device which could result is neither of the parallel preamble transmissions result in a collision. In this way the embodiment discussed above is able to significantly reduce the collision probability without a duplication of data resources.

In addition to dual connectivity (DC) many User Equipment (UE) devices also support Carrier Aggregation (CA). Carrier Aggregation (CA) allows a device to transmit simultaneously on different component-carriers of a single eNodeB.

Figure 6:
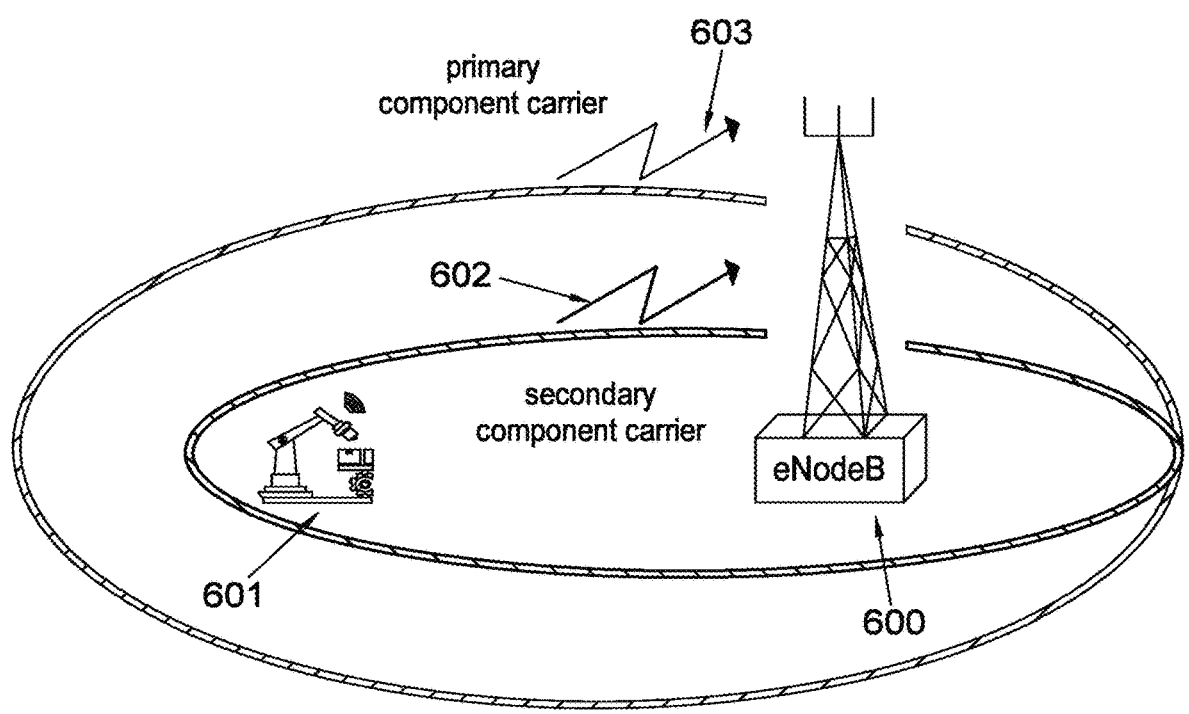
FIG. 6 shows an example of Carrier Aggregation (CA)

FIG. 6 shows an example of Carrier Aggregation (CA). FIG. 6 shows a User Equipment (UE) device 601 which supports Carrier Aggregation (CA). In FIG. 6 the User Equipment (UE) device 601 communicates with an eNodeB 600 using a primary component carrier 603 and a secondary component carrier 602. By using more than one carrier in the same frequency band, or in different frequency bands, it is possible to increase the bandwidth available to the User Equipment (UE) device 601 and increase the capacity of the communications link.

In an embodiment parallel preambles are transmitted using carrier aggregation (CA) and packet duplication. In this example a preamble is duplicated onto two component carriers of the same eNodeB (e.g. the primary component carrier 603 and the secondary component carrier 602).

Figure 7A:
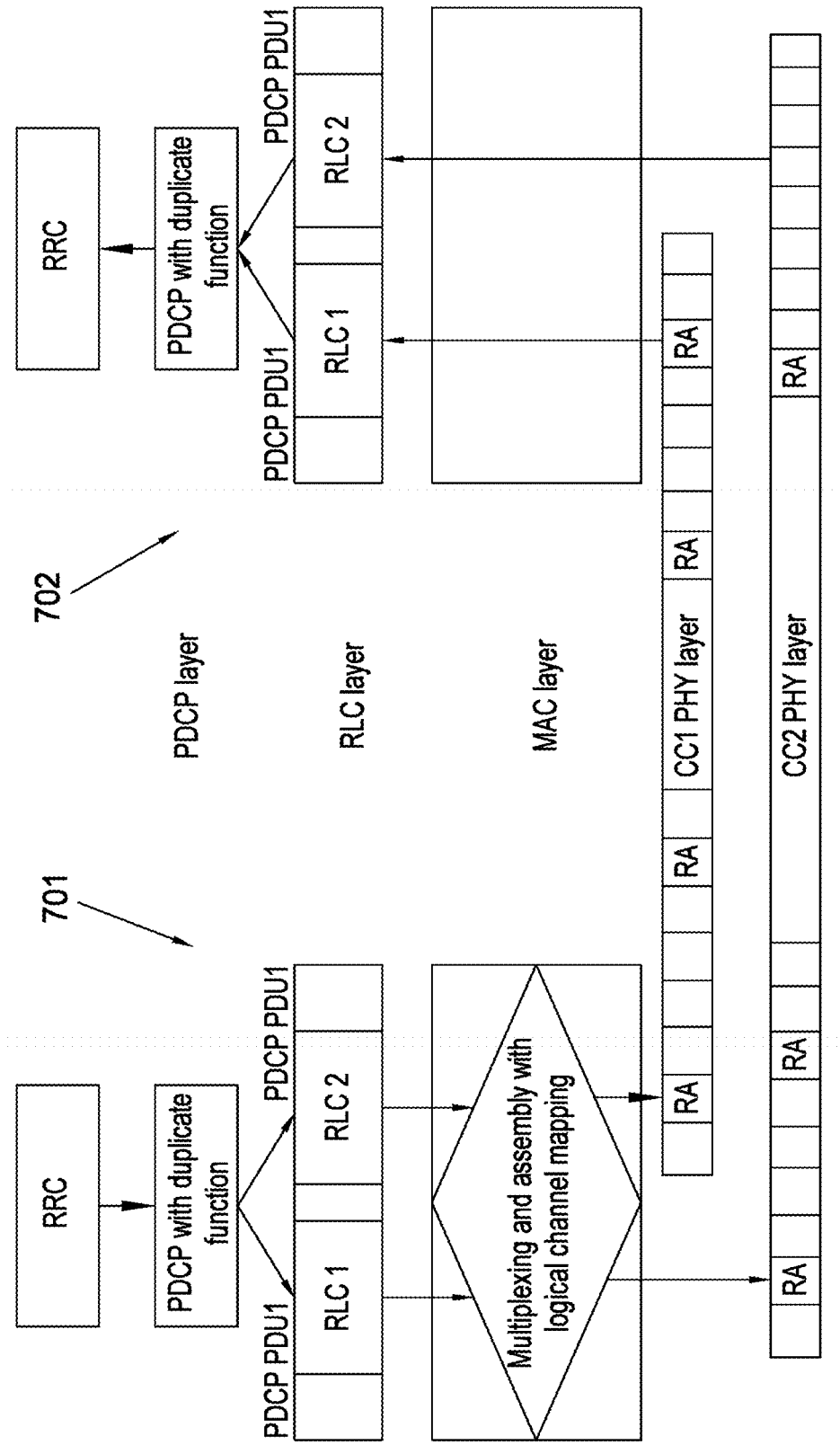
FIG. 7A shows a LTE protocol stack according to an embodiment.

FIG. 7A shows a LTE protocol stack according to an embodiment. FIG. 7A shows a protocol stack comprising a Radio Resource Control (RRC) layer, a Packet Data Convergence Protocol (PDCP) layer, a Radio Link Control (RLC) layer, a Medium Access Control (MAC) layer and two Physical (PHY) layers for Component Carrier 1 (CC1) and Component Carrier 2 (CC2). FIG. 7A comprises a protocol stack for a transmitter (e.g. a User Equipment (UE) device) 701 and a protocol stack for a receiver (e.g. an eNodeB) 702.

Each protocol stack comprises an RRC layer. In essence the purpose of the RRC layer is to broadcast System Information and establish a connection between the UE and an eNodeB. Each protocol stack also comprises a PDCP layer. In an embodiment the packet duplication functionality, along with the packet discard functionality, exists in the PDCP layer. In this example the Radio Resource Control (RRC) layer configures lower layers in the stack for carrier aggregation and packet duplication.

As part of packet duplication process a Packet Data Convergence Protocol (PDCP) Protocol Data Unit (PDU) message (e.g. PDCP PDU1) is associated with a separate instances of the Radio Link Control (RLC) layer (i.e. RLC1 and RLC2) since there are now two radio links (e.g. a first radio link with Component Carrier 1 and a second radio link with Component Carrier 2) between the User Equipment (UE) device and the eNodeB.

In FIG. 7A a single entity in the Medium Access Control (MAC) layer is configured to simultaneously map the duplicate MAC Protocol Data Units (PDU), generated from the two instances in the Radio link control (RLC) layer (i.e. RLC1 and RLC2), to independent component carriers (e.g. Component Carrier 1 (CC1) and Component Carrier 2 (CC2)).

In an embodiment the mapping of logical channels (residing between the RLC layer and the MAC layer) to specific component carriers on the PHY layer is determined based on a flag per logical channel which indicates whether the logical channel is allowed to be scheduled on a specific component carrier.

Using a common entity in the MAC layer enables the transmission of parallel preambles in Carrier Aggregation (CA) to be timed more accurately.

Optionally, this embodiment is selected when the User Equipment (UE) determines, based on the contents of the SIB2 message broadcast by the eNodeB, that carrier aggregation is being used by the eNodeB. Unlike the known carrier aggregation procedure, in FIG. 7A the second component carrier is accessed in the control plane (i.e. as part of the protocol stack which handles radio-specific functionality).

Although there is only a single eNodeB, and consequently a single SIB2 message, the SIB2 message comprises RACH parameters for both component carriers. Each component carrier has different RACH parameters associated with it, as a result there will be different preamble sets associated with each component carrier. By transmitting two Random Access requests, both with randomly selected preambles, the collision probability is reduced compared to transmitting a single randomly selected preamble. This approach is similar to the embodiments discussed above; however instead of using Dual Connectivity functionality to communicate with two eNodeB's the Random Access procedure shown in FIG. 7A communicates on two component carriers of the same eNodeB using the carrier aggregation functionality.

Figure 7B:
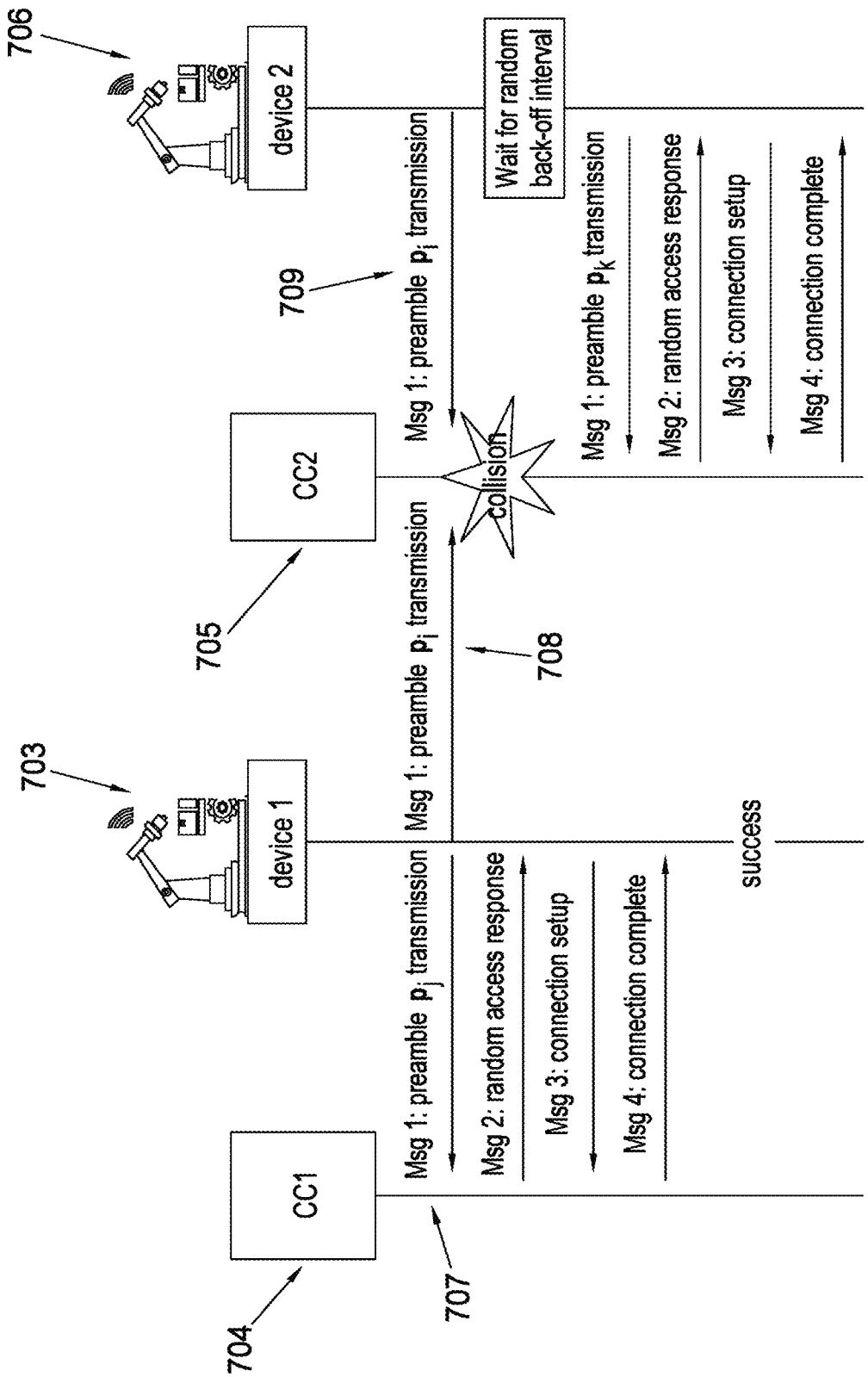
FIG. 7B shows a random access procedure using carrier aggregation according to an embodiment.

FIG. 7B shows a random access procedure using carrier aggregation according to an embodiment. FIG. 7B shows a first User Equipment (UE) device 703 in communication with a first component carrier CC1 704 of an eNodeB and a second component carrier CC2 705 of the same eNodeB. In FIG. 7B the first User Equipment (UE) device 703 begins the random access procedure on the first component carrier CC1 704 using the preamble $p_j$ 707. The first User Equipment (UE) device 703 subsequently begins the random access procedure on the second component carrier CC2 705 using the preamble $p_i$ 708 at the next random access opportunity.

In FIG. 7B a second User Equipment (UE) device 706 begins the random access procedure in step 709 at the same time, and using the same preamble (i.e. $p_i$) as the first User Equipment (UE) device 703. As a result a collision occurs between the first User Equipment (UE) device 703 and the second User Equipment (UE) device on the second component carrier CC2 705.

Since the first User Equipment (UE) device 703 begins the random access procedure on both component carriers (i.e. CC1 704 and CC2 705) the overall probability that the first user Equipment (UE) device 703 will be unable to complete the random access procedure due to collision is reduced. This can be seen in FIG. 7B where it shows the random access procedure 707 completing on component carrier one, CC1 704.

Since the first User Equipment (UE) device 703 transmits a random access request (i.e. 'Msg 1') on two component carriers (CC1 704 and CC2 705) it is possible, if there is no collision detected by the eNodeB, that the User Equipment (UE) device 703 will receive two random access responses (i.e. 'Msg 2').

Optionally, the first User Equipment (UE) device 703 responds with a 'Msg 3' (i.e. an RRC connection request) on the component carrier which it first received a 'Msg 2'. If the two random access responses are received at the same time the first User Equipment (UE) device 703 responds to either of them, optionally by random selection.

Since carrier aggregation only uses a single eNodeB, the overall latency associated with the random access procedure does not need to take into account the delay associated with the X2 interface (used to communicate information between eNodeBs).

If, on the other hand, a 'Msg 2' is not received on either component carrier, the 'Msg 1' is presumed to be lost and the first User Equipment (UE) device 703 reattempts the random access procedure on both component carriers after a back off period has elapsed.

In a different embodiment packet duplication is used with a single component carrier during the random access procedure.

Figure 8:
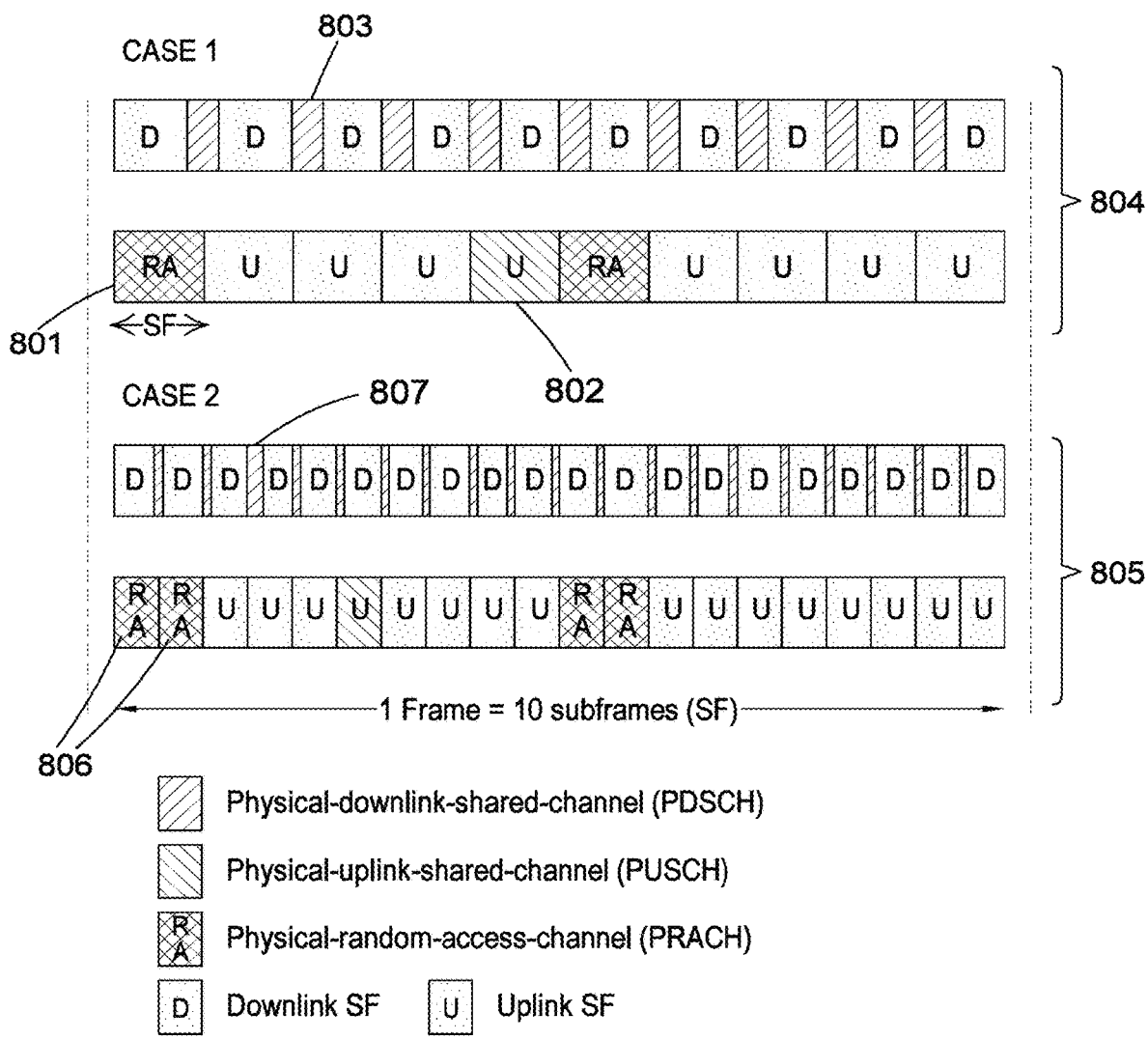
FIG. 8 shows parallel preamble transmission using packet duplication on a single component carrier according to an embodiment.

FIG. 8 shows parallel preamble transmission using packet duplication on a single component carrier according to an embodiment. When only a single component carrier is present both of the Protocol Data Units (generated by the LTE protocol stack of FIG. 7A) are transmitted by the User Equipment (UE) device.

FIG. 8 shows a standard LTE RA procedure with a subcarrier spacing of 15 KHz, 804. When using the standard LTE random access procedure duplicate packets are transmitted on a Physical Random Access CHannel resource 801 before the eNodeB assigns resources 802 via the next available Physical-downlink-control-channel (PDCCH) 803. Transmitting duplicate preambles in this way reduced the effect of a collision at 'Msg 3' and 'Msg 4' on the time taken to complete the Random Access procedure.

FIG. 8 also shows a flexible numerology proposed for 5G New Radio (NR), where the subcarrier spacing is increased to 30 KHz, 805. The increased subcarrier spacing results in smaller symbol duration and thus the duplicate Msg 1 RA 806 can be sent within the same subframe before allocating the PDCCH resources 807 for the requested Msg 1 RA. By transmitting two successive Random Access requests, the probability that at least one Random Access does not suffer a collision, and therefore the probability of a successful random access procedure increases.

Although in the examples discussed above each modification to the standard random access procedure is considered separately, for the avoidance of doubt it is emphasized that each of the modification presented above could co-exist in the same random access procedure.

Optionally the modification to the random access procedure used by the User Equipment (UE) device could depend on a configuration of the network. For example, if an eNodeB is configured to support carrier aggregation the User Equipment would use the random access procedure show in FIG. 7B preferentially. If the eNodeB does not support carrier aggregation but is located within a macro cell (i.e. there are two eNodeB's) the User Equipment would select one of the enhancements shown in FIG. 4 or FIG. 5.

In the examples above parallel preambles are transmitted on different resources (e.g. on a different eNodeB or on a different component carrier (CC)). In another embodiment a User Equipment (UE) device generates orthogonal Zadoff-Chu (ZC) sequences and randomly chooses multiple preambles instead of a single preamble as used in the standard LTE random access procedure.

As discussed above; after receiving the SIB2 message, the User Equipment (UE) device generates 64 orthogonal Zadoff-Chu sequences by applying a cyclic shift to a root sequence which is defined by the root sequence index and the configuration index contained within the periodically broadcast SIB2 message. In the standard LTE random access procedure the number of preambles available for contention based random access (p) is 54.

In LTE the eNodeB transmits a SIB2 message comprising a logical root sequence. The logical root sequence is mapped to a physical root sequence 'U' in accordance with the LTE specification. Optionally, this step is performed using a table. For example logical root sequences 24 to 29 are mapped to physical root sequences 56, 783, 112, 727, 148 and 691 respectively. Consequently, if the SIB2 message broadcast by the eNodeB contains logical root sequence 29, then the User Equipment (UE) will use the physical root sequence U=691 to generate the base Zadoff-Chu sequence in accordance with equation 1 below.

In accordance with the LTE specification, the physical root sequence 'U' is cyclically shifted by a predetermined number of samples to generate $U_i$ which generates a different Zadoff-Chu sequence. Multiple cyclic shifts are applied to the physical root sequence 'U' in order to generate 54 preambles.

By combining multiple preambles into a code word the number of possible preambles (i.e. the preamble set size) equals $p^n$, where n is the number of preambles that are combined. In contrast the standard LTE random access procedure uses a preamble set size of p. In the case of standard LTE where the number of preambles available for contention based access (p) equals 54, combining two preambles (i.e. n=2) increases the preamble set size from 54 to $54^2$ (or 2916).

Combining multiple preambles increases the preamble set size from which a User Equipment (UE) device can randomly select a preamble without increasing the amount of resources required to transmit the preamble sequence. Furthermore, combining multiple preambles does not require dual connectivity or carrier aggregation functionality.

This is possible by exploiting a characteristic of Zadoff-Chu sequences. When a first Zadoff-Chu sequence is multiplied by the conjugate of a second Zadoff-Chu sequence the product is a third Zadoff-Chu sequence with a root index $U=U_i-U_j$ where $U_i$ is the root sequence for a first preamble $P_i$ and $U_j$ is the root sequence for a second preamble $P_j$. This result can be verified mathematically by combining the algebraic representations of two Zadoff-Chu sequences.

A Zadoff-Chu sequence is characterized by the following equation:

$$ZC(U,n) = e^{(-2j*pi*U*n*(n+1)/2/N)} = e^{-2j*pi*M(U,n)} \tag{1}$$

Where:
n is the time index and takes values from n=0 to N−1, where N is the length of the sequence;
U is known as the physical root sequence index and in LTE can take values from 1 to 838. A logical root sequence index is mapped to a physical root sequence number which is used by the User Equipment to generate the ZaddOff-Chu sequence. Based on this sequence it is possible to generate the plurality of preambles by applying a cycling shift to the base sequence.

The phase term of the Zadoff-Chu sequence (M(U, n)) uses similar parameters and is given by:

$$M(U, n) = U * \left( n * \frac{n+\frac{1}{2}}{N} \right) \bmod N \tag{2}$$

If the first preamble $P_i$ is multiplied by the conjugate of the second preamble $P_j$ the phase term becomes:

$$M(U_i, n)M(U_j, n)^* = U_i * \left( n * \frac{n+\frac{1}{2}}{N} \right)\left( U_j * \left( n * \frac{n+\frac{1}{2}}{N} \right) \right)^* \bmod N \tag{3}$$

$$= (U_i + U_j) * \left( n * \frac{n+\frac{1}{2}}{N} \right) \bmod N$$

$$= M(U_i + U_j, n)$$

Equation 3 shows that the product of two Zadoff-Chu sequences is another Zadoff-Chu sequence.

In LTE it is routine for the eNodeB to maintain a table of all the possible root sequences which could be used as the basis of a preamble. When multiple preambles are combined this table is augmented with entries corresponding to the different possible combinations of root sequences which could result by combining preambles.

For example in the standard LTE with p=54 preambles there are 27 root sequence entries in the table maintained by the eNodeB. In contrast, when two preambles are combined the maximum possible code word entries in the table maintained by the eNodeB is $(p/2)^2=27^2=729$. The root sequences of the preambles transmitted by the eNodeB are determined at the eNodeB by using auto correlation and cross correlation functions and finding the maximum value, similar to standard LTE but this time using an augmented table of root sequences.

Thus in an embodiment an eNodeB comprises two tables, a first table comprising 27 root sequence index's associated with the 54 possible preambles (for use with the standard LTE random access procedure) and a second table containing the combinations of these 27 root sequences indexes, resulting in a total of 729 code words that are used for enhanced preamble detection.

After identifying the combined root sequence the eNodeB could also to determine which root sequences where combined to generate this combined root sequence (and therefore the transmitted preamble) although this step would not be necessary for the purpose of the random access procedure.

Once the combined root sequence has been determined the random access procedure continues in accordance with the standard LTE random access procedure described in FIG. 1. As a result, modifying the random access procedure to use multiple combined preambles does not require substantial modifications to the procedure or require carrier aggregation or dual connectivity functionality, but instead only requires a different set of values to be used as part of 'Msg 1'.

Combining multiple preambles in this way, increases the set of possible preambles and reduces the probability that two User Equipment (UE) devices will select the same preamble and cause a collision. Although in the above example two preambles are combined to form a code word it is emphasized that more than two preambles could be combined to form a code word. In this case the preamble length would remain unchanged however the number of entries in the table maintained by the eNodeB would increase accordingly.

Figure 9:
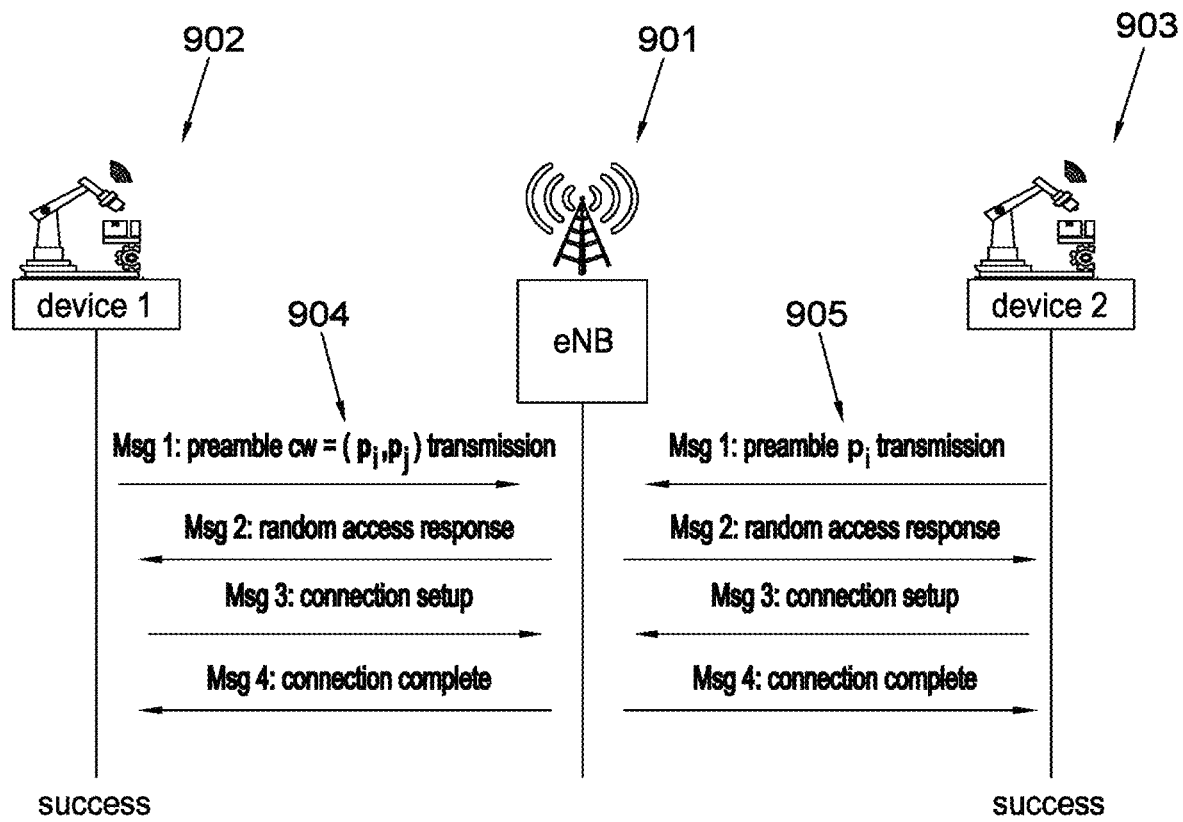
FIG. 9 shows a random access procedure using an enhanced preamble set according to an embodiment.

FIG. 9 shows a random access procedure using an enhanced preamble set according to an embodiment. FIG. 9 shows an eNodeB 901, a first User Equipment (UE) device 902 and a second User Equipment (UE) device 903. The first User Equipment (UE) device 902 is configured to generate a combined preamble based on multiple preambles in a preamble set.

After receiving the SIB2 message from the eNodeB, the first and the second User Equipment (902 & 903) devices generate orthogonal Zadoff-Chu sequences using the root sequence index and the configuration index. In FIG. 9 the first User Equipment (UE) device 902 generates a code word based on two randomly selected preambles from the set of possible preambles, namely $p_i$ and $p_j$.

In step 904 the first User Equipment (UE) device 902 begins the random access procedure by transmitting a random access request comprising the code word formed by combining two preambles from the set of possible preambles. At the same time the second User Equipment (UE) device 903 begins the standard random access procedure with the preamble $p_i$. Even though the preamble $p_i$ forms part of the preamble code word used by the first User Equipment (UE) device 902 it will not cause a collision because the root sequence for the code word is different to the root sequence of the code word's constituent preambles.

As a result both the first User Equipment (UE) device 902 and the second User Equipment (UE) device 903 can identified separately by the eNodeB 901 and complete the random access procedure. By increasing the set of possible preambles the enhancement discussed above reduces the collision probability and therefore reduces the latency, or delay, associated with the allocation of communications resources.

Although the above example discloses the use of enhanced preamble sets with the standard LTE random access procedure, it is emphasized that enhanced preamble sets could be used with any of the protocol enhancement discussed above, specifically the enhancements that make use of dual connectivity and carrier aggregation functionality.

Figure 10:
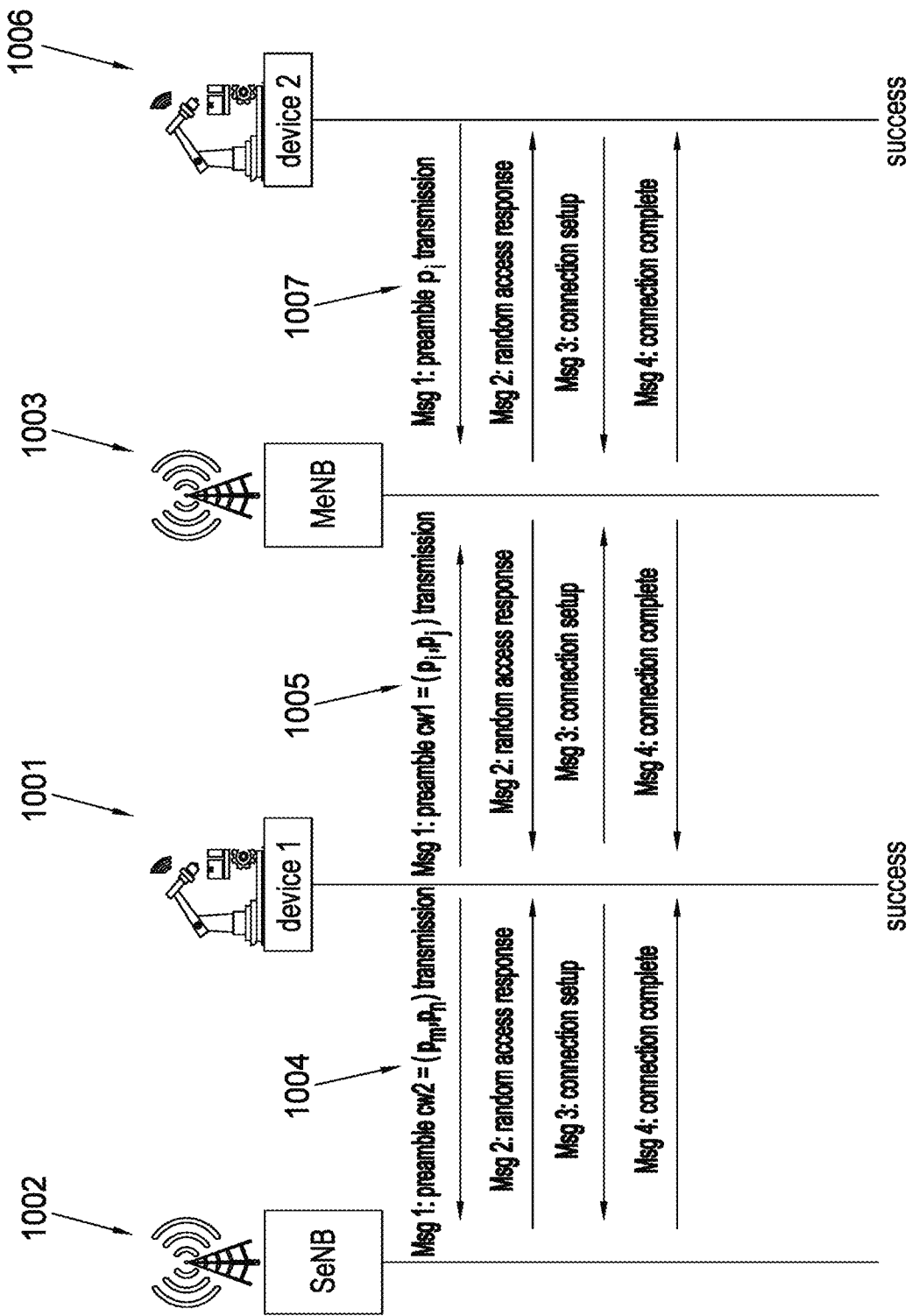
FIG. 10 shows a random access procedure using parallel preambles and an enhanced preamble set according to an embodiment.

FIG. 10 shows a random access procedure using parallel preambles and an enhanced preamble set according to an embodiment. FIG. 10 shows a first User Equipment (UE) device 1001 which is configured with dual connectivity. The first User Equipment (UE) device 1001 receives a SIB2 message periodically broadcast by a Master-eNodeB 1003 and a SIB2 message periodically broadcast by the Secondary-eNodeB 1002. The first User Equipment (UE) device 1001 subsequently generates a first set of orthogonal preamble sequences for random access with the Master-eNodeB 1003 and a second set of orthogonal preamble sequences for random access with the Secondary-eNodeB 1002 based on the root sequence index present in the respective SIB2 messages.

The first User Equipment (UE) device 1001 then combines a plurality of preambles from the first set of orthogonal preamble sequences to generate a preamble code word (codeword1). Optionally, the number of preambles combined by the first User Equipment (UE) device 1001 is two. FIG. 10 shows the preamble code word ("cw1") being generated by combining preambles; $p_i$ and $p_j$. In an embodiment combining comprises the product of a first preamble with the conjugate of a second preamble.

Accordingly, in FIG. 10 the first User Equipment (UE) device 1001 also combines a plurality of preambles from the second set of orthogonal preamble sequences to generate a preamble code word (codeword2). In FIG. 10 the preamble code word ("cw2") is generated by combining preambles $p_m$ and $p_n$.

After generating a first code word (i.e. $(p_i, p_j)$) the first User Equipment (UE) device 1001 begins the random access procedure on the first Master-eNodeB 1003 as shown in step 1005. Independently, and simultaneously, the first User Equipment (UE) device 1001 begins the random access procedure on the Secondary-eNodeB 1002, in step 1004. As part of the random access procedure on the Secondary-eNodeB 1002 the first User Equipment (UE) device 1001 transmits a preamble comprising a second preamble code word (i.e. $(p_m, p_n)$).

At the same time as the simultaneous transmissions by the first User Equipment (UE) device 1001, a second User Equipment (UE) device 1006 also begins the random access procedure on the Master-eNodeB 1003, as shown in step 1007. The second User Equipment (UE) device 1006 uses the preamble $p_i$ as part of the random access request.

Even though the preamble $p_i$ forms part of the code word used by the first User Equipment (UE) device 1001 it will not cause a collision at the Master-eNodeB 1003 since the root sequence for the code word is different from the root sequence of the code word's constituent preambles, thereby enabling the Master-eNodeB 1003 to identify each User Equipment (UE) device.

As a result both the first User Equipment (UE) device 1001 and the second User Equipment (UE) device 1006 can complete the random access procedure on the Master-eNodeB 1003 without a collision.

The first User Equipment (UE) device 1001 responds to the first random access response (i.e.

'Msg 2') received from either of the eNodeB's.

By using parallel preamble with an enhanced preamble set the LTE random access procedure discussed above provides redundancy by using dual connectivity and also increases the preamble set size by combining preambles. In this way the collision probability for a device which supports dual connectivity and the enhanced preamble set can be massively reduced when compared to the standard LTE random access procedure. By reducing the collision probability the random access procedure discussed above improves the reliability of the random access request (i.e. 'Msg 1') and therefore the latency (or access delay) associated with establishing a communications link.

Although the random access procedure described above uses an enhanced preamble set with dual connectivity (no X2 interface co-ordination), it is emphasized that the enhanced preamble set discussed above could also be combined with dual connectivity (with X2 interface coordination) and carrier aggregation.

The performance of a random access procedure comprising parallel preambles using an enhanced preamble set was tested by simulation.

Figure 11:
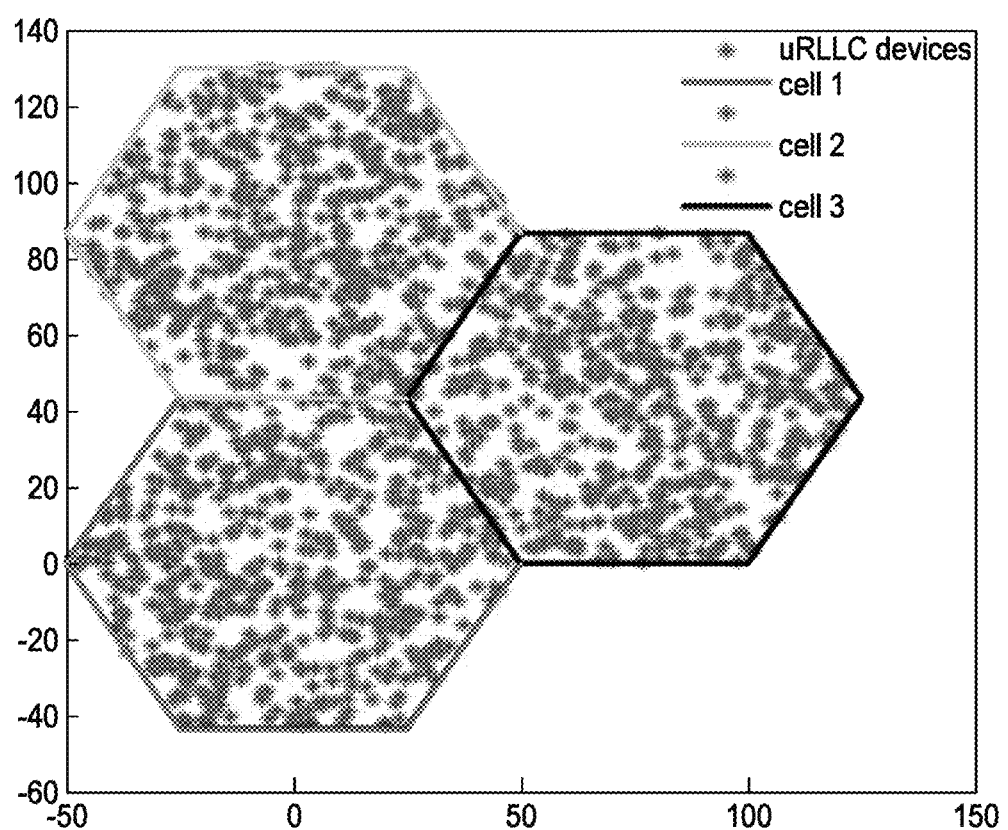
FIG. 11 shows a simulated spatial deployment model.

FIG. 11 shows a simulated spatial deployment model. FIG. 11 shows a 3-cell hexagonal layout with a maximum cell radius of 50 meters comprising a plurality of uniformly distributed uRLLC devices. Each uRLLC device is located at a minimum radius of 5 meters and a maximum of 50 metres from a Master-eNodeB. For the dual connectivity configuration the spatial model is further segregated into cells served by a Secondary-eNodeBs (or the small cell). In the dual connectivity configuration the neighbouring cell's Master eNodeB becomes the secondary eNodeB for the current cell, thus each device is served by a Master and a Secondary eNodeB.

In the following simulations the start time of the random access procedure by each device is characterized by a beta probability distribution when considered over a 10 second time interval.

Figure 12A:
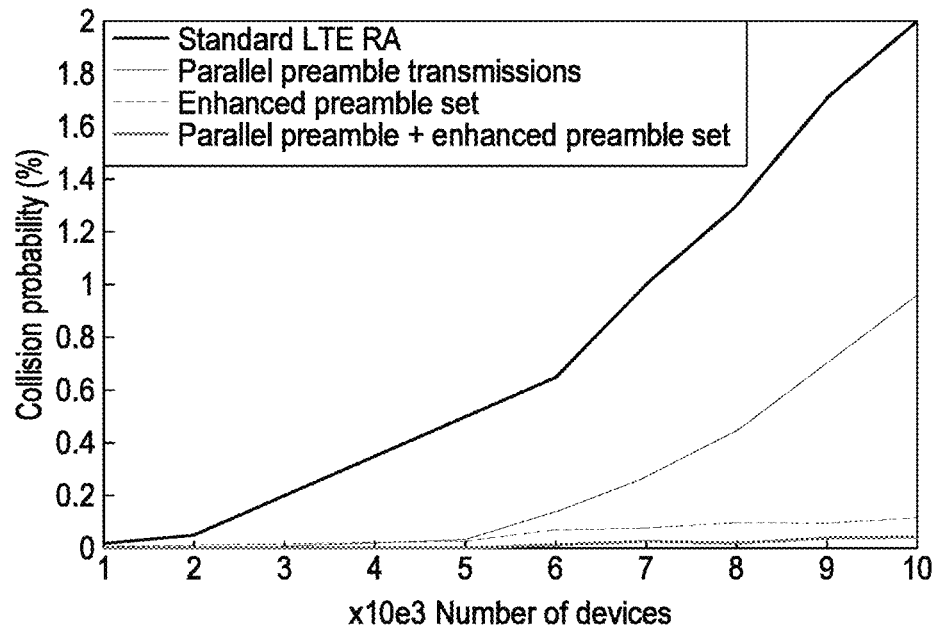
FIG. 12A shows the collision probability during a random access procedure for the spatial deployment model of FIG. 11.

FIG. 12A shows the collision probability during a random access procedure for the spatial deployment model of FIG. 11. FIG. 12A shows the collision probability during the LTE random access procedure wherein the uRLLC devices are configured to use: the standard LTE random access procedure; parallel preamble transmissions; enhanced preamble set; and parallel preamble and enhanced preamble set.

FIG. 12A shows that the enhancements to the random access procedure presented herein reduce the collision probability when compared to the standard LTE random access procedure. FIG. 12A shows that even when 10000 devices are performing a random access procedure the collision probability using parallel preambles is 50% of the collision probability when using the standard LTE random access procedure. When using an enhanced preamble set the collision probability drops by 94% for 10000 devices compared to the standard LTE random access procedure.

Furthermore when using parallel preambles with an enhanced preamble set the collision probability drops by 98% compared to the standard LTE random access procedure. FIG. 12A also shows that when using parallel preambles with an enhanced preamble set around 6000 devices can perform the random access procedure in a single attempt without a collision.

Figure 12B:
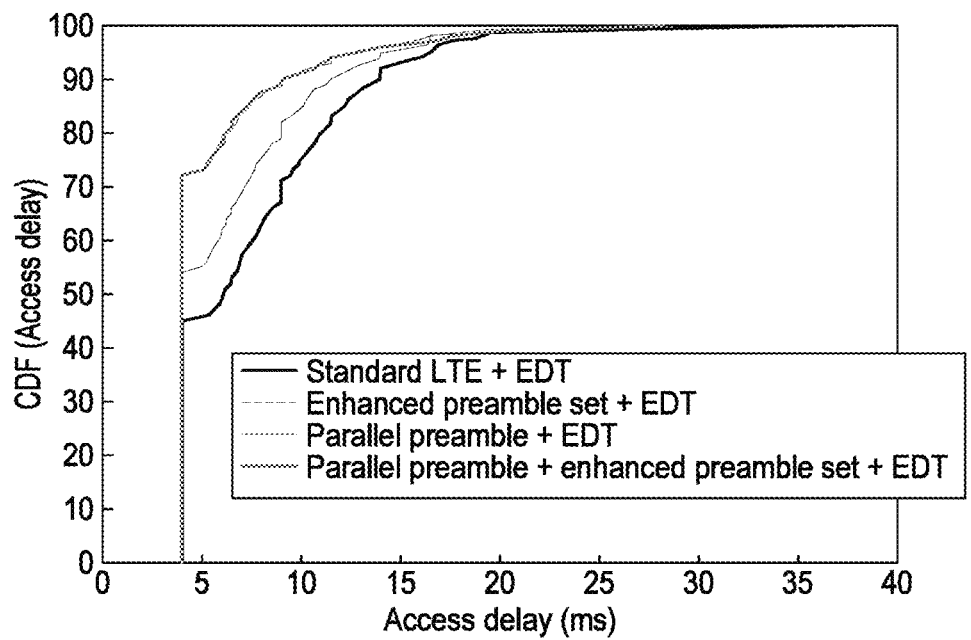
FIG. 12B shows the access delay associated with a random access procedure for devices in the spatial deployment model of FIG. 11.

FIG. 12B shows the access delay associated with a random access procedure for devices in the spatial deployment model of FIG. 11. FIG. 12B shows the access delay (i.e. the time until the random access procedure is completed) for deployments configured to use: the standard LTE random access procedure; parallel preamble transmissions; enhanced preamble set; and parallel preamble and enhanced preamble set.

In FIG. 12B each of the deployments also use Early-data transmission (EDT). Early-data-transmission (EDT) has been proposed in 3GPP to reduce the uRLLC end-to-end RACH access delay. When Early-data-transmission (EDT) is used the device transmits data as part of 'Msg 1' in the random access procedure. FIG. 12B shows that for a random access procedure using parallel preamble with enhanced preamble set 90% of devices have an access delay less than 10 milliseconds, compared to 75% of devices when the standard LTE random access procedure is used.

By using an enhanced preamble set (formed by combining a plurality of preambles) and/or by using a parallel preamble (through dual connectivity, dual connectivity and X2 co-ordination or carrier aggregation) the methods and devices discussed herein: reduce the access delay and improve the reliability of Ultra-reliable low-latency communication (uRRLC) devices in the Factories-of-the-future, enhance the co-existence of Ultra-reliable low-latency communication (uRRLC) and massive-machine-type communication (mMTC) devices in the Factories-of-the-Future, and improve random access resource utilization.

The enhancements to the random access procedure discussed above are performed by a User Equipment (UE) device and an eNodeB (or base station) as part of the random access procedure to establish a communications link.

Figure 13A:
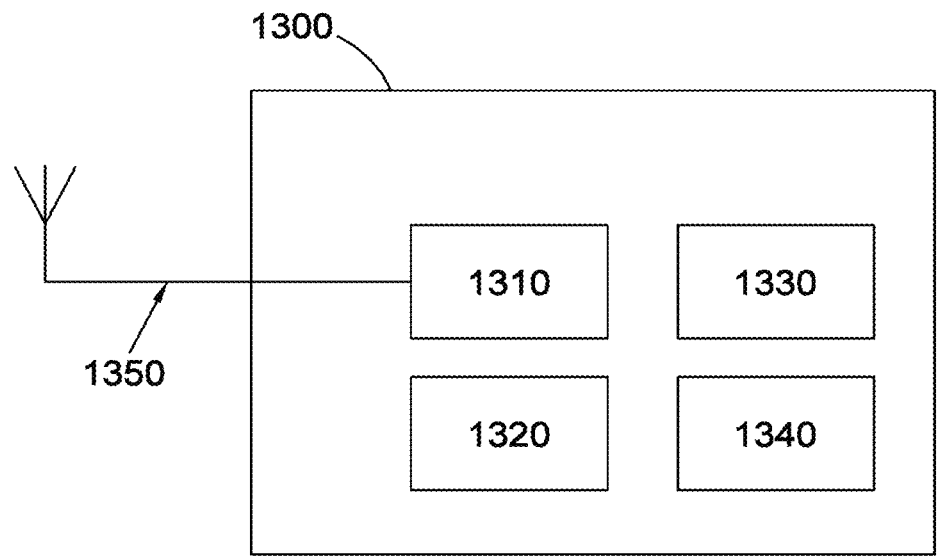
FIG. 13A shows a User Equipment (UE) device according to an embodiment.

FIG. 13A shows a User Equipment (UE) device according to an embodiment. The User Equipment (UE) device 1300 comprises an input/output module 1310, a processor 1320 and a non-volatile memory 1330. The input/output module 1310 is communicatively connected to an antenna 1350. The antenna 1350 is configured to receive signals from, and transmit signals to, an eNodeB (or base station). The processor 1320 is coupled to the input/output module 1310 and to the non-volatile memory 1330. The non-volatile memory 1330 stores computer program instructions that, when executed, cause the processor 1320 to execute program steps that implement the random access procedures described herein.

Optionally the User Equipment (UE) device comprises a sensor module 1340. The processor 1320 is also coupled to the sensor module 1340, the sensor module 1340 is configured to generate information for transmission across the network including, but not limited to, measurements of an industrial process and changes in an environment within which the device 1300 operates. Alternatively or additionally to the sensor module 1340, the device 1300 can contain an actuator module. The actuator module is coupled to the microprocessor 1320 and is configured to move or control a mechanism external to the device 1300.

Whilst in the embodiment described above the antenna 1350 is shown to be situated outside of, but connected to, the device 1300 it will be appreciated that in other embodiments the antenna 1350 forms part of the device 1300. Furthermore, although in FIG. 13A only a single antenna 1350 is shown it is emphasized that the input/output module 1310 may comprise a plurality of antennas.

In one embodiment the device 1300 is a sensor node in a sensor network for monitoring an industrial process. The sensor node may be configured to perform any number of functions including, but not limited to, quality control, predictive machinery maintenance and factory safety.

Taking quality control as an example; the sensor module 1340 may contain a camera that is capable of in-process inspection for quality control, thereby allowing the manufacturer to identify and resolve failures.

Other uses outside of an industrial process are of course also possible. In fact, the methods and devices that are described herein can relate generally to any wireless network where a random access procedure is used to obtain communication resources.

Figure 13B:
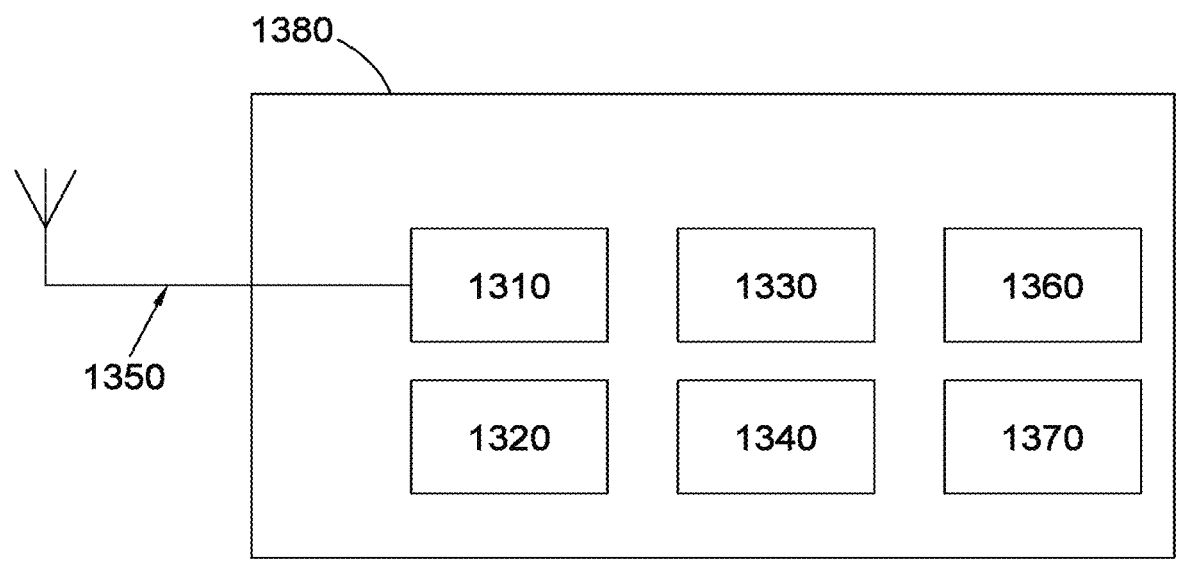
FIG. 13B shows an eNodeB according to an embodiment.

FIG. 13B shows an eNodeB according to an embodiment. In FIG. 13B similar reference numerals are used to FIG. 13A are used to denote similar components. As a result a detailed description of the repeated components will be omitted. FIG. 13B shows an eNodeB 1380 comprising an X2 interface 1360 and a backhaul output 1370 which are both connected to the processor 1320. As discussed above the X2 interface 1360 enables the eNodeB to communicate directly with other eNodeB's without having to route communications via the backhaul output 1370 which is connected to the backhaul infrastructure of the network.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of randomly accessing wireless communication resources in an uplink comprising:
   transmitting, by a user device, a first access request and a second access request wherein:
      the first access request is transmitted on a first communication channel from a plurality of communication channels, the second access request is transmitted on a second communication channel from the communication channels, the first communication channel being different from the second communication channel, and
      the first access request comprises a first preamble generated using a first root sequence, and the second request comprises a second preamble generated using a second root sequence, the first root sequence being different from the second root sequence;
   receiving, at the user device, at least one access response via the communication channels;
   completing an access procedure on one of the first communication channel or the second communication channel which conveyed the access response; and
   receiving two or more access responses and completing an access procedure on a communication channel that first conveyed the access response,
   wherein a base station uses a plurality of component carriers and wherein the first communication channel uses a first component carrier from the component carriers, and the second communication channel uses a second component carrier from the component carriers, the first component carrier being different from the second component carrier.

2. A method of randomly accessing wireless communication resources in an uplink comprising:
   transmitting, by a user device, a first access request and a second access request wherein:
      the first access request is transmitted on a different communication channel from a plurality of communication channels, the second access request is transmitted on a second communication channel from the communication channels, the first communication channel being different from the second communication channel, and
      the first access request comprises a first preamble generated using a first root sequence, and the second request comprises a second preamble generated using a second root sequence, the first root sequence being different from the second root sequence;
   receiving, at the user device, at least one access response via the communication channels;
   completing an access procedure on one of the first communication channel or the second communication channel which conveyed the access response; and
   receiving two or more access responses and completing an access procedure on a communication channel which first conveyed the access response,
   wherein the first communication channel is established with a first base station from a plurality of base stations, the second communication channel is established with a second base station from the base stations, and the first base station is different from the second base station.

3. A method according to claim 2, wherein the base stations comprise a plurality of slave base stations communicatively coupled to a master base station.

4. A method according to claim 3, further comprising:
   communicating the first access request and the second access request received by the slave base stations to the master base station;
   determining, at the master base station, the base stations which received an access request from a user device; and
   transmitting an access response to the user device by one of the first base station or the second base station from the base stations which received the access request.

5. A method according to claim 4, wherein the access request further comprises an indication of signal strength and wherein the method further comprises:
   selecting which base station transmits the access response based on the indication of signal strength in the first access request and the second random access request.

6. A method according to claim 1, wherein the preamble is generated by multiplying a first preamble by a conjugate of a second preamble.

7. A method of randomly accessing wireless communication resources in an uplink comprising:
   transmitting, by a user device, a first access request and a second access request wherein:
      the first access request is transmitted on a first communication channel from a plurality of communication channels, the second access request is transmitted on a second communication channel from the communication channels, the first communication channel being different from the second communication channel, and
      the first access request comprises a first preamble generated using a first root sequence, and the second request comprises a second preamble generated using a second root sequence, the first root sequence being different from the second root sequence;
   receiving, at the user device, at least one access response via the communication channels; and
   completing an access procedure on one of the first communication channel or the second communication channel which conveyed the access response,
   wherein the first preamble is generated by multiplying a third preamble by a conjugate of a fourth preamble,
   wherein the third preamble is based on the first root sequence and the fourth preamble is based on a cyclic shifted version of the first root sequence.

8. A method of randomly accessing wireless communication resources in an uplink comprising:
   transmitting, by a user device, a first access request and a second access request wherein:
      the first access request is transmitted on a first communication channel from a plurality of communication channels, the second access request is transmitted on a second communication channel from the communication channels, the first communication channel being different from the second communication channel, and
      the first access request comprises a first preamble generated using a first root sequence, and the second request comprises a second preamble generated using a second root sequence, the first root sequence being different from the second root sequence;

receiving, at the user device, at least one access response via the communication channels;

completing an access procedure on one of the first communication channel or the second communication channel which conveyed the access response; and decoding the first preamble using an augmented table comprising the first root sequence and the second root sequence and possible combinations of the first root sequence and the second root sequence, wherein the first preamble is generated by multiplying a third preamble by a conjugate of a fourth preamble.

9. A method of operating a user device in a network comprising:

transmitting a first access request and a second access request wherein:

the first access request is transmitted on a first communication channel from a plurality of communication channels, the second access request is transmitted on a second communication channel from the communication channels, the first communication channel being different from the second communication channel, and the first access request comprises a first preamble generated using a first root sequence, and the second request comprises a second preamble generated using a second root sequence, the first root sequence being different from the second root sequence;

receiving at least one access response via the communication channels;

completing an access procedure on one of the first communication channel or the second communication channel which conveyed the access response; and receiving two or more access responses and completing an access procedure on a communication channel which first conveyed the access response, wherein the first communication channel uses a first component carrier of a base station and the second communication channel uses a second component carrier of the base station, the first component carrier being different from the second component carrier.

10. A method according to claim 9, wherein the first communication channel is established with a first base station from a plurality of base stations, the second communication channel is established with a second base station from the base stations, and the first base station is different from the second base station.

11. A method according to claim 9, wherein the first access request further comprises an indication of a first base station's signal strength, and the second access request further comprises an indication of a second base station's signal strength.

12. A method according to claim 9, wherein the first preamble is generated by multiplying a third preamble based on a first root sequence by a conjugate of a fourth preamble based on a cyclic shifted version of the first root sequence.

13. A method of operating a base station in a network comprising a plurality of base stations wherein the base station is operable in a master configuration and a slave configuration, the method comprising:

receiving an access request from a user device; and in the slave configuration:

communicating the access request and an identifier associated with the user device to a master base station; and transmitting an access response to the user device when instructed by the master base station;

in the master configuration:

determining a number of base stations which received an access request from the user device;

determining, a base station from the number of base stations to transmit the access response;

instructing the base station from the number of base stations to transmit the access response to the user device.

14. A method according to claim 13, wherein the access request comprises an indication of signal strength and determining a base station from the number of base stations is based on the indication of signal strength in the access request.

15. A method according to claim 14, wherein the base stations are communicatively coupled to each other by an X2 interface.

16. A method according to claim 13, wherein the access request comprises a preamble and the method further comprises: decoding a preamble using an augmented table comprising a first root sequence and the second root sequence and possible combinations of the first root sequence and the second root sequence, the first root sequence being different from the second root sequence.

* * * * *